(12) United States Patent
Trull et al.

(10) Patent No.: US 6,460,130 B1
(45) Date of Patent: Oct. 1, 2002

(54) DETECTING FULL CONDITIONS IN A QUEUE

(75) Inventors: Jeffrey E. Trull, San Jose, CA (US); Eric W. Mahurin, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/281,079

(22) Filed: Mar. 30, 1999

Related U.S. Application Data

(63) Continuation-in-part of application No. 09/253,466, filed on Feb. 19, 1999, now Pat. No. 6,185,672, and a continuation-in-part of application No. 09/253,478, filed on Feb. 19, 1999, now Pat. No. 6,247,114.

(51) Int. Cl.[7] .............................................. G06F 13/00
(52) U.S. Cl. ............................ 712/32; 711/154; 710/57
(58) Field of Search ............................ 712/32; 710/57; 711/100, 154

(56) References Cited

U.S. PATENT DOCUMENTS

| | | | | |
|---|---|---|---|---|
| 4,916,658 A | * | 4/1990 | Lee | 711/100 |
| 5,406,554 A | * | 4/1995 | Parry | 365/189.01 |
| 5,509,130 A | * | 4/1996 | Trauben | 712/215 |
| 5,931,926 A | * | 8/1999 | Yeung | 710/52 |
| 5,966,547 A | * | 10/1999 | Hagan et al. | 709/247 |
| 6,138,135 A | * | 10/2000 | Karp | 708/496 |
| 6,145,061 A | * | 11/2000 | Garcia | 711/154 |

OTHER PUBLICATIONS

Patterson et al., "Computer Architecture A Quantitative Approach," Morgan Kaufmann Publishers, Inc., 1990, pp. 321–322.

* cited by examiner

*Primary Examiner*—Eric Coleman
(74) *Attorney, Agent, or Firm*—Conley, Rose & Tayon, PC; B. Noël Kivlin

(57) ABSTRACT

A microprocessor having an instruction queue capable of out-of-order instruction dispatch and efficiently detect full conditions is disclosed. The microprocessor may comprise a plurality of instruction execution pipelines, an instruction cache, and an instruction queue coupled to the instruction cache and execution pipelines. The instruction queue may comprise a plurality of instruction storage locations and may be configured to output up to a predetermined number of non-sequential out of order instructions per clock cycle. The microprocessor may be further configured with high speed control logic coupled to the instruction queue. Instead of determining exactly how many empty storage locations are present in the queue, the control logic may be configured to determine whether the number of non-overlapping strings of empty storage locations is greater than or equal to the number of estimated instructions currently on their way to being stored in the instruction queue. A data queue and method for managing a queue are also disclosed, as is a computer system utilizing the above-mentioned microprocessor.

24 Claims, 29 Drawing Sheets

ORDER OF
EXECUTION

CLOCK 1 { A = A+4;
CLOCK 2 { B = B+6;
           A = A*2;
CLOCK 3 { C = C*5;
CLOCK 4 { B = B*A;

*FIG. 2A*

ORDER OF
EXECUTION

CLOCK 1 { A = A+4;
           C = C*5; /* out of order */
CLOCK 2 { B = B+6;
           A = A*2;
CLOCK 3 { B = B*A;

*FIG. 2B*

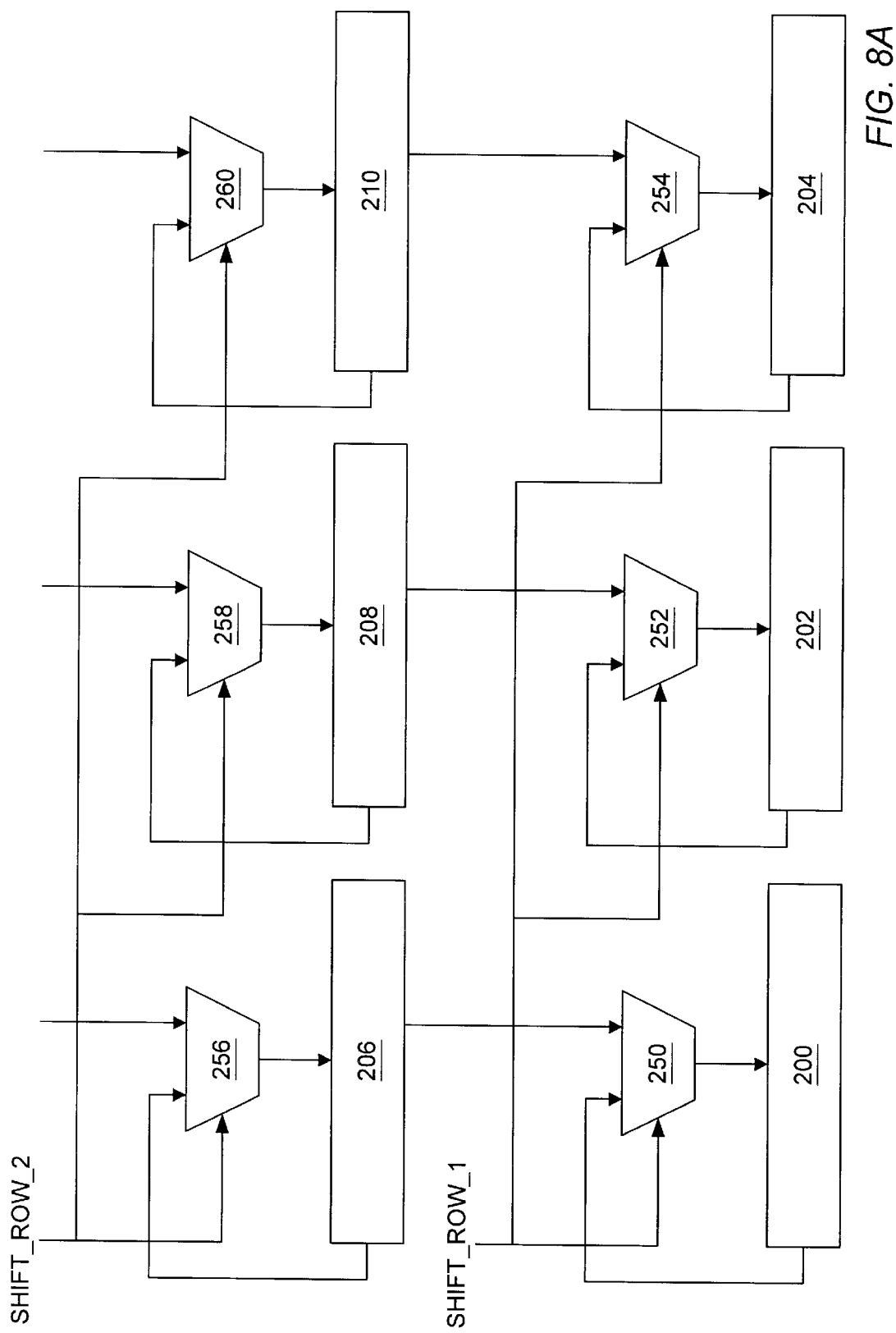

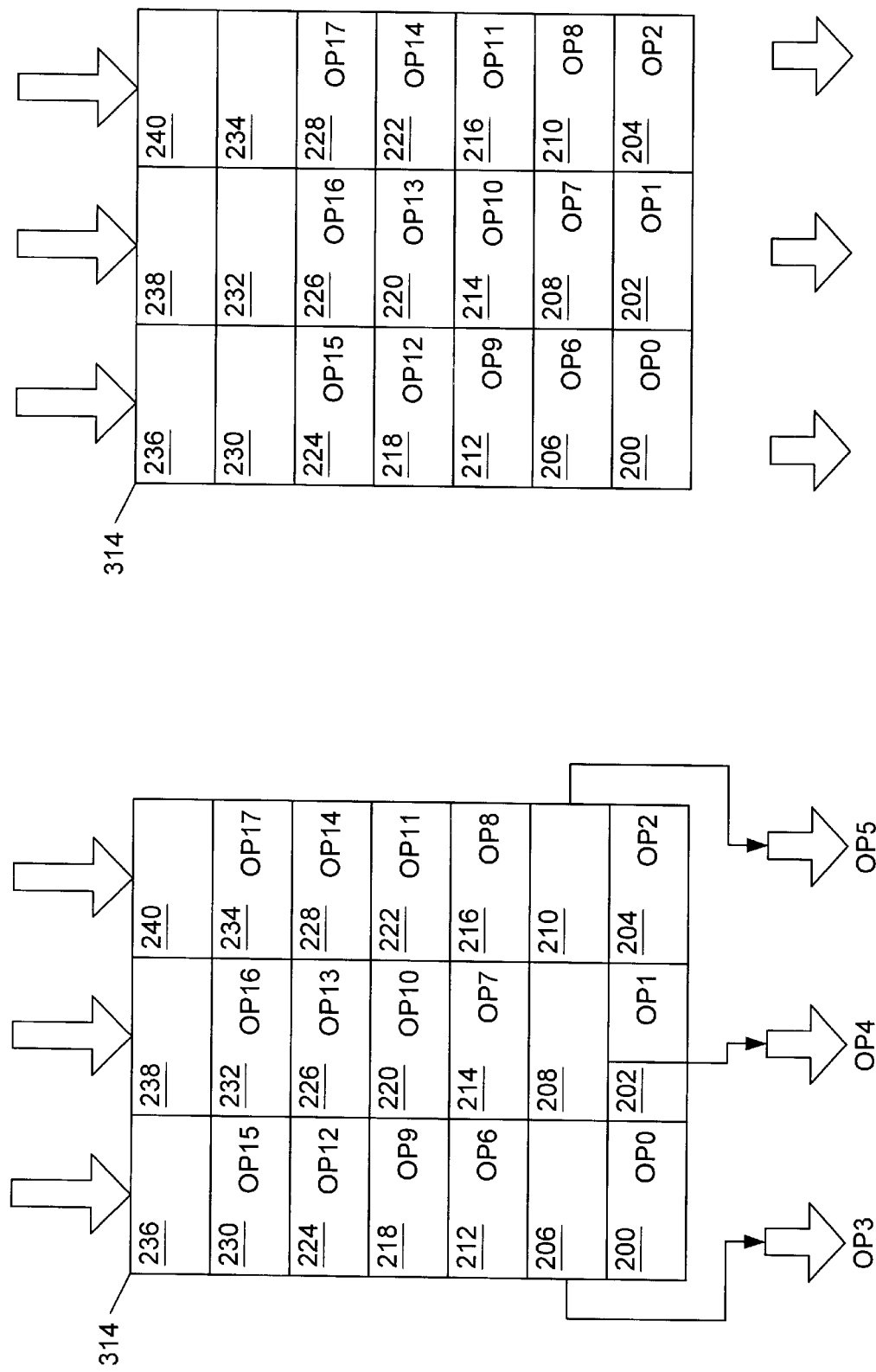

DETECTING FULL CONDITIONS IN A QUEUE

CONTINUATION DATA

This patent application is a continuation-in-part of U.S. patent application Ser. No. 09/253,466, now U.S. Pat. No. 6,185,672, filed Feb. 19, 1999, entitled "Method and Apparatus for Instruction Queue Compression" by Jeffrey E. Trull, and of U.S. patent application Ser. No. 09/253,478, filed Feb. 19, 1999 now U.S. Pat. No. 6,247,114, entitled "Rapid Selection of Oldest Eligible Entry in a Queue" by Jeffrey E. Trull.

BACKGROUND OF THE INVENTION

1. Field of the Invention

This invention relates to microprocessors and, more particularly, to compressing instruction queues that are accessed in an out-of-order fashion.

2. Description of the Relevant Art

Superscalar microprocessors are capable of attaining performance characteristics which surpass those of conventional scalar processors. Superscalar microprocessors achieve this greater performance by concurrently executing more than one instruction per clock cycle. Superscalar microprocessors use a number of different techniques to allow them to execute more than one instruction per clock cycle. Pipelining is one such technique. Pipelining refers to dividing the execution of an instruction into a number of stages. This allows multiple instructions to be overlapped during the execution process. For example, one pipeline stage may be configured to fetch instructions from the microprocessor's instruction cache. Another pipeline stage may be configured to decode the fetched instructions. Decoding typically refers to determining the boundaries of the instruction and what (if any) operands the instruction requires (e.g., source and destination operands). Additional pipeline stages may include instruction execution and instruction retiring (i.e., storing the results generated by executing the instruction). After an instruction completes the first pipeline stage, it advances to the second stage while next instruction in program order enters the first pipeline stage.

In addition to pipelining, most superscalar microprocessors are configured with multiple functional units. The functional units (also referred to as functional pipelines or execution-units) are responsible for executing most instructions. For example, a superscalar microprocessor may have two or more add/subtract functional units, each configured to execute a separate instruction in parallel. Examples of these instructions may be integer operations such as addition and subtraction, logic functions such as ORs, and ANDs, and other simple operations such as shifts and compares.

In addition to pipelining and multiple functional units, many superscalar microprocessors rely upon branch prediction to further improve performance. Branch prediction attempts to prevent the functional units from stallng. Branch instructions control the flow of program execution and dictate which instructions are executed and which are not. During program execution, when a branch instruction is received, the microprocessor determines whether or not the instruction is "taken" or "not taken". When a branch instructions is taken, the next instruction fetched is non-sequential (i.e., the next instruction is read from a destination address specified in the branch instruction). Conversely, when a branch instruction is "not taken", the destination address in the branch instruction is ignored, and the next instruction fetched is the instruction immediately following the branch instruction. Branch prediction attempts to predict whether or not the branch instruction will be "taken" or "not taken" before the branch instruction has actually been executed.

The advantages of branch prediction are particularly evident in a pipelined microprocessor. Without branch prediction, when a branch instruction completes the first stage of an instruction processing pipeline, the microprocessor will have to wait until the branch instruction completes execution before fetching the next instruction. Thus, the first pipeline stage would sit idle (i.e., stall) while waiting for the results of the branch instruction. Branch prediction allows the first pipeline stage to fetch the predicted "target" instruction without stalling. If the prediction is incorrect, all pipeline stages are flushed and the microprocessor begins anew using by fetching the "correct" next instruction according to the results of the executed branch instruction. While branch prediction techniques vary, most achieve at least a 90% prediction accuracy rate.

Another technique used in superscalar microprocessors is out-of-order execution. Software programs consist of a number of instructions that are executed in a particular order. In some cases, if this order is changed, the functionality of the program may be changed. Turning now to FIG. 1A, a sample portion of a program is illustrated. As the figure illustrates, instructions are ordered to achieve a desired result (i.e., A=4, B=6, C=10, and D=9). Turning now to FIG. 1B, an example of out-of-order execution is shown The instruction "D=A+5" is executed out-of-order, but the functionality of the original code segment is maintained (i.e., the same results are achieved as with the original code segment). This is possible because the instruction "D=A+5" is not dependent upon either of the instructions "B 2" or "B=A+B". However, not all instructions are capable of out-of-order execution. Turning now to FIG. 1C, an example of improper out-of-order instruction execution is shown. In this example, the instruction "C=B+A" is executed out of order before instructions "B=A+B" and "D=A+5". This changes the functionality of the original code segment (i.e., resulting with C=6 instead of C=9).

Turning now to FIGS. 2A and 2B, an example illustrating why out-of-order instruction execution is particularly desirable in superscalar microprocessors is shown. For simplicity, this example assumes a microprocessor having only one addition pipeline and one multiplication pipeline, with each operation taking one clock cycle to execute. FIG. 2A shows that the original code sequence will take four clock cycles to complete execution. In contrast, by executing the instruction "C=C*5" out-of-order, the code sequence in FIG. 2B takes only three clock cycles to complete. Thus, out-of-order execution may allow instructions that are "ready to execute" to bypass those that are not, thereby more efficiently utilizing the hardware resources of the microprocessor.

To effectively implement an out-of-order microprocessor, many designers have resorted to large buffers called "instruction queues" that store decoded instructions waiting to be executed. The instruction queue is searched each clock cycle to determine which instructions should be dispatched for execution. The larger the buffer, the greater the number of decoded instructions that may be stored. The greater the number of instructions that may be stored, the greater the probability of finding a set of instructions to execute in parallel (i.e., thereby preventing any functional units from stalling).

Turning now to FIG. 3A, a figure illustrating the functionality of an instruction queue 160 is shown As instructions are decoded, they are stored into instruction queue 160. During normal operation, each functional pipeline 162–168 is configured to receive one instruction per clock cycle. For example, add pipeline 162 may be configured to receive one add instruction per clock cycle from instruction queue 160. Similarly, add pipeline 164 may also be configured to receive one add instruction per clock cycle, while multiply pipeline 166 may receive one multiply instruction per clock cycle, and load/store pipeline 168 may receive one load or store instruction per clock cycle.

As the figure illustrates, the instructions may be conveyed to pipelines 162–168 in an out-of-order fashion. For example, assuming all instructions stored in instruction queue 160 are ready for dispatch (i.e., ready to be conveyed to functional pipelines 162–168), the two oldest add instructions are conveyed to add pipelines 162 and 164. Instruction queue 160 may comprise control logic (not shown) that is configured to select the oldest instruction ready for dispatch to each functional pipeline. The control logic is also responsible for shifting the instructions remaining in instruction queue 160 after dispatch to make room for new instructions in the next clock cycle.

Since the only instructions that are searched for possible dispatch are those stored in the instruction queue 160, one or more functional pipelines may stall if the queue is not long enough. Turning now to FIG. 3B, an example of a functional pipeline stall is illustrated. As the figure shows, add pipeline 164 will stall because there is only one add instruction in instruction queue 160. Instruction queue is too small to store the next add instruction. As a result, the instruction queue's control logic cannot dispatch it, and add pipeline 164 will stall.

In order to reduce the possibility of these types of functional pipeline stalls, microprocessor designers have implemented larger instruction queues and have attempted to match the number of functional units to the distribution of instructions in typical code. These techniques have their limitations, however. For example, modem code has begun to rely more heavily upon floating point instructions (e.g., floating point multiplication) to implement advanced features such as 3D graphics and multimedia. A floating point hardware multiplier, however, consumes a great deal of die space. Thus, having an optimum number of multiplier functional units may not be feasible.

Simply increasing the size of the instruction queue also has limitations. The larger the instruction queue, the more complex the instruction queue's control logic becomes. This complexity may dramatically increased the die space consumed by the control logic and may slow the instruction queue's performance. As microprocessor clock speeds continue to climb, these limitations on instruction queue size may affect the overall performance of the microprocessor, and the performance of floating point units in particular.

For the reasons outlined above, an efficient method for implementing instruction queues capable of out-of-order instruction dispatch is desired. Furthermore, an efficient method for detecting when the queue is full is also desired.

SUMMARY OF THE INVENTION

The problems outlined above may in part be solved by a microprocessor having an instruction queue configured to dispatch instructions in an out-of-order fashion and perform unaligned compaction of strings of empty storage locations. The microprocessor may be configured to read instructions from an instruction cache, store them in a queue, and then read them from the queue in an out-of-order fashion. Reading the instructions in this manner may create bubbles or gaps of empty storage locations within the queue. These bubbles may be compacted out by shifting the remaining instructions a fixed number of storage locations. By shifting a fixed number of storage locations, this may advantageously simplify the shifting and control logic responsible for managing the queue when compared with previous variable-shift methods.

To further simplify the control logic responsible for managing the queue, the microprocessor may be configured to efficiently detect full conditions in the instruction queue. For example, instead of determining exactly how many empty storage locations are present in the queue, the microprocessor may be configured to determine whether the number of non-overlapping strings of empty storage locations is greater than or equal to the number of estimated instructions currently on their way to being stored in the instruction queue.

The microprocessor may also be configured to rapidly select the oldest eligible entry in the instruction queue. The microprocessor may be configured with high speed control logic coupled to the instruction queue. The control logic may comprise two pluralities of multiplexers, wherein the first plurality of multiplexers are configured to select a first subset of the instructions stored in the queue. The second plurality of multiplexers then select a second subset of instructions from the first subset. Advantageously, this process may be performed in parallel, thereby reducing oldest. eligible entry selection times. For example, the control signals for the second plurality of multiplexers may be calculated at the same time the first plurality of multiplexers are performing their selection. This may be repeated for a number of stages of multiplexers.

The techniques summarized above may also be applicable in queues other than instruction queues. For example, they may potentially be used in memory queues and digital communication queues.

In one embodiment, the microprocessor may comprise a plurality of instruction execution pipelines, an instruction cache, and an instruction queue. The instruction queue is coupled to the instruction cache and to the plurality of instruction execution pipelines. The instruction queue itself comprises a plurality of instruction storage locations, each coupled to a single "destination" storage location. New instructions are written into the "stop" or start of the queue, while the oldest eligible instructions are read from different positions within the queue. As instructions are read out of the queue, bubbles of empty storage locations form in the queue. To reduce or eliminate these bubbles, the remaining instructions in the queue are shifted down the queue, thereby making room for new instructions at the top of the queue. When instructions are shifted in the queue (referred to as the "compaction" process), the instructions are shifted from their current storage location to a corresponding destination storage location further down the queue.

In some embodiments, each storage location in the queue may be configured to shift its contents either zero or N storage locations (wherein N is a predetermined integer constant). Advantageously, this may simplify the control logic and may potentially speed the compaction process in some embodiments. The instruction queue may be further configured to output up to a predetermined maximum number of out-of-order and non-sequential instructions per clock cycle. In some embodiments, the control logic and or instruction queue may comprise a plurality of multiplexers configured to perform the compaction process.

In one embodiment, the instruction storage locations may be configured into a plurality of logical rows and columns, wherein each multiplexer's source instruction storage location and destination instruction storage location are stored within the same column. The number of logical columns may equal the maximum number of instructions the instruction queue may output in a single clock cycle, and the instructions within each particular column may be ordered according to their relative age. For example, each column may have a "newest" instruction end and an "oldest" instruction end, the instructions within each column being ordered according to relative age.

In another embodiment, the instruction storage locations may be logically arranged in a linear fashion, wherein each instruction storage location is offset from its corresponding destination instruction storage location by a predetermined number of storage locations.

A method for managing an instruction queue is also contemplated. In one embodiment, the method comprises inputting two or more instructions into the instruction queue per clock cycle. As previously described, the instruction queue may comprise a plurality of instruction storage locations, each corresponding to a particular destination instruction storage location. Next, two or more non sequential instructions may be read out of the instruction queue. Finally, the remaining instructions in the instruction queue may be compacted. Compacting may be performed by independently shifting each remaining instruction to its corresponding destination instruction storage location if the destination storage location is empty (or is also being shifted). The method may further comprise emptying the instruction storage locations after the instructions contained therein are output from the queue. This may be accomplished in a number of ways, e.g., by setting a clear bit corresponding to the instructions storage location.

BRIEF DESCRIPTION OF THE DRAWINGS

Other objects and advantages of the invention will become apparent upon reading the following detailed description and upon reference to the accompanying drawings in which:

FIG. 2A is a diagram illustrating the number of clock cycles needed to execute a sample code sequence in program order.

FIG. 2B is a diagram illustrating the number of clock cycles needed to execute a sample code sequence out-of-order.

FIG. 8A illustrates a portion of another embodiment of an instruction queue.

FIGS. 8B–8C illustrate examples of one embodiment of aligned compaction.

Figure 1A:
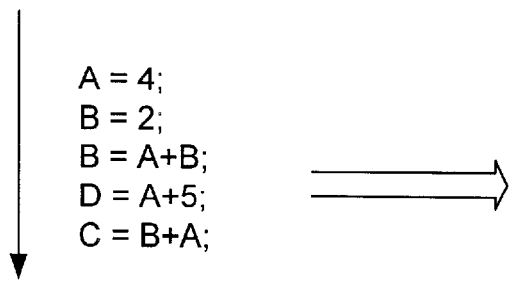
FIG. 1A is a diagram illustrating a sample code sequence.
Figure 1B:
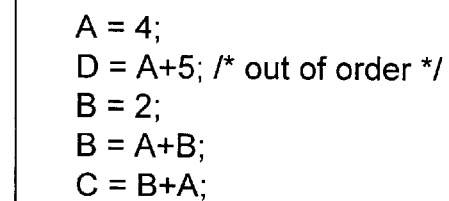
FIG. 1B is a diagram illustrating out-of-order instruction execution.
Figure 1C:
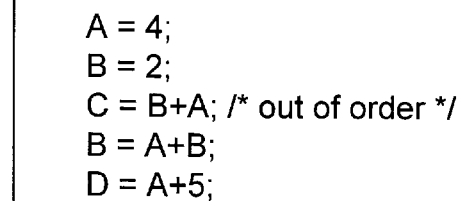
FIG. 1C is a diagram illustrating improper out-of-order instruction execution.
Figure 3A:
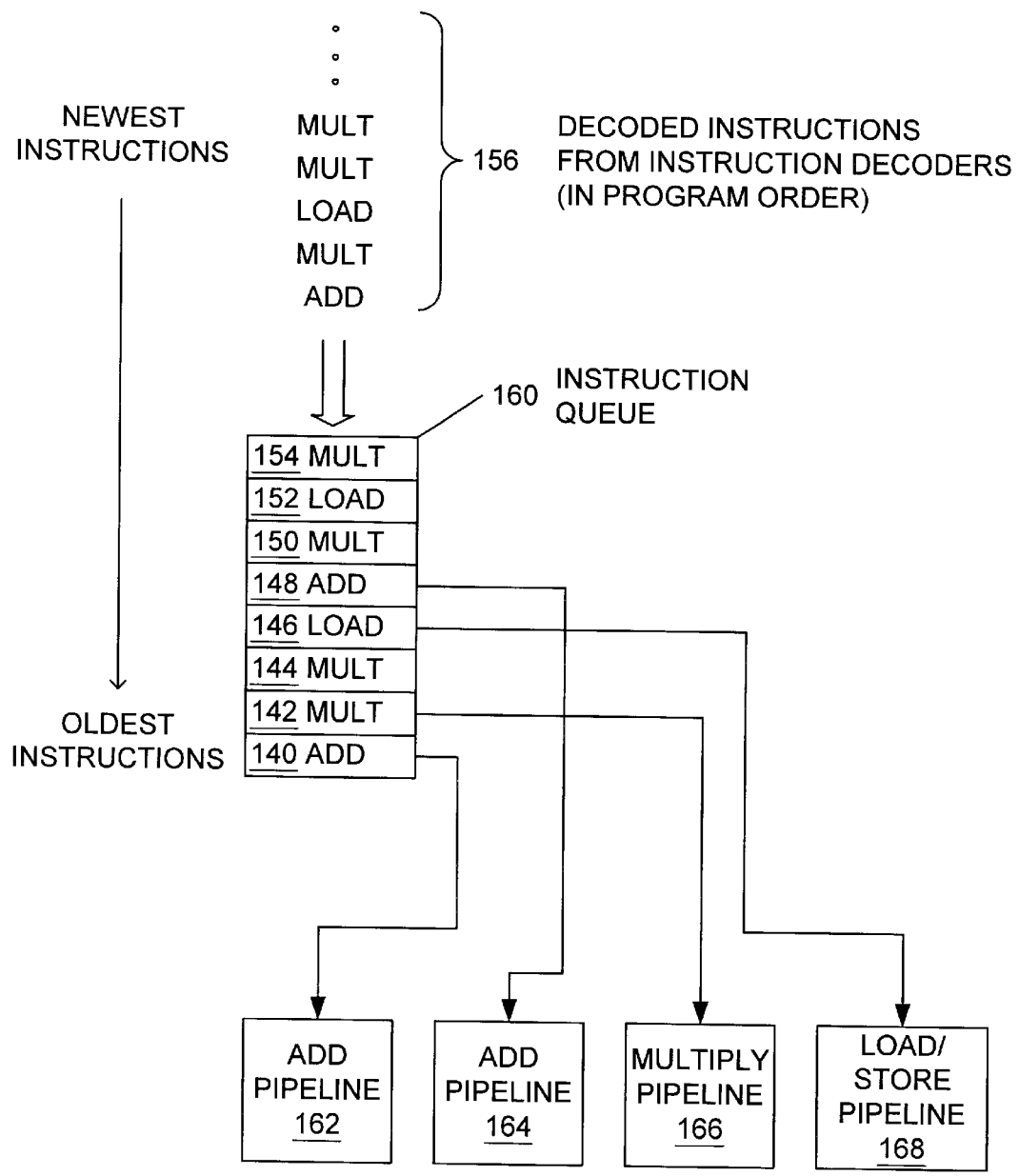
FIG. 3A is a diagram illustrating the operation of an instruction queue.
Figure 3B:
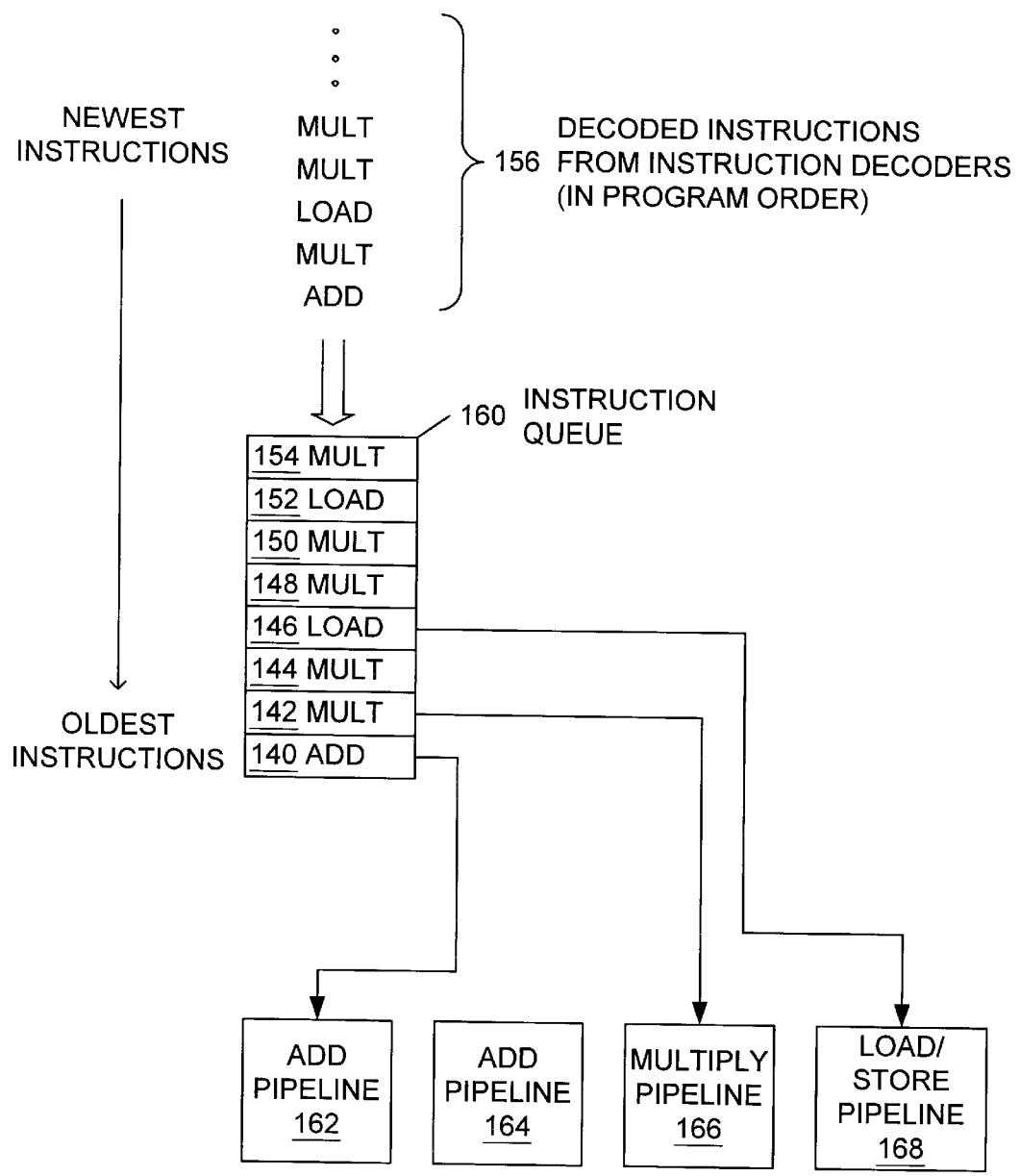
FIG. 3B is a diagram illustrating one situation in which a functional unit may stall.

While the invention is susceptible to various modifications and alternative forms, specific embodiments thereof are shown by way of example in the drawings and will be described in detail herein. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

Before describing the details of the improved instruction queue, a general description of a microprocessor and floating point unit configured to utilize the instruction queue is provided.

Microprocessor

Figure 4:
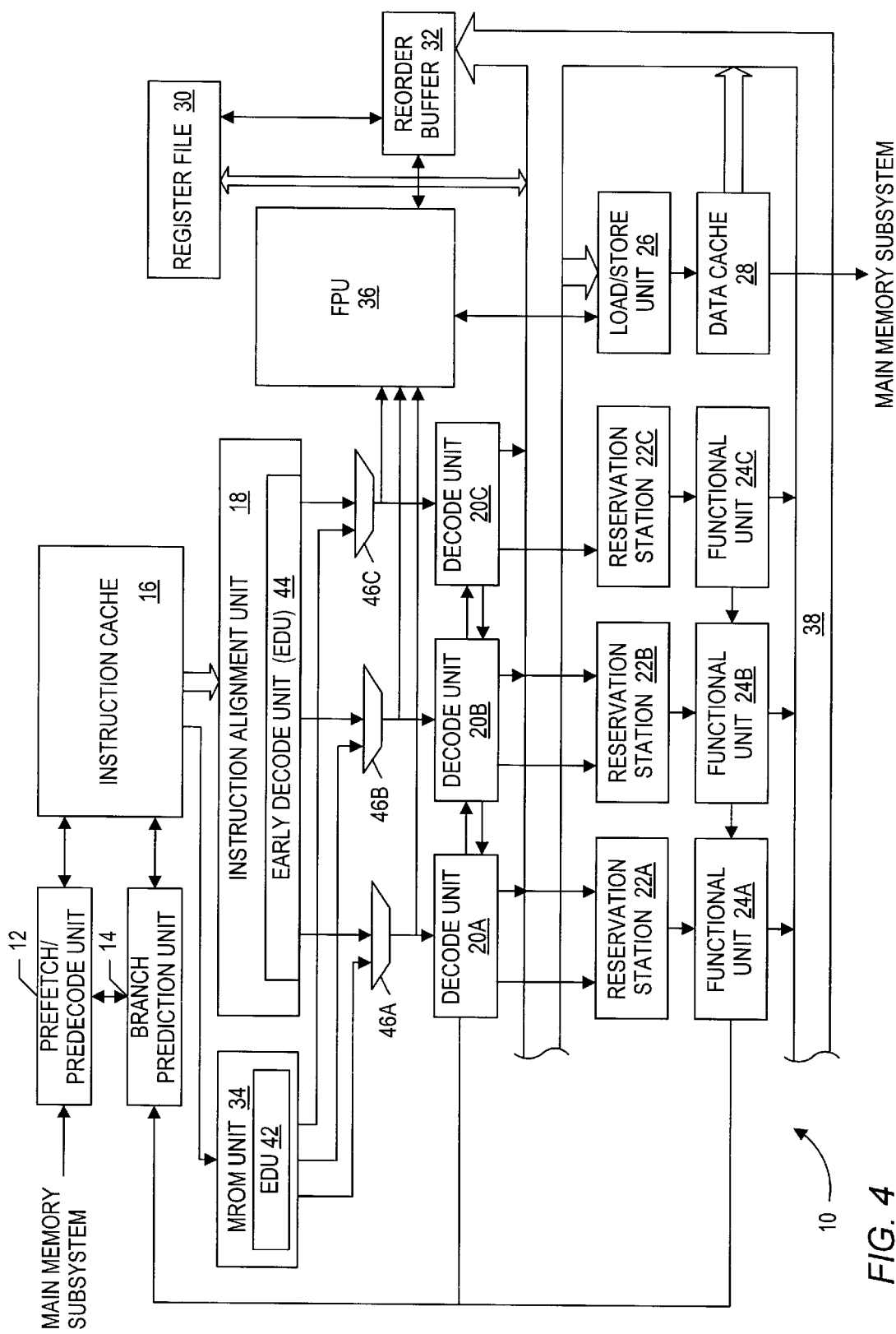
FIG. 4 is a diagram illustrating one embodiment of a microprocessor.

Turning now to FIG. 4, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a floating point unit (FPU). Elements referred to herein with a particular reference number followed by a letter may be collectively referred to by the reference number alone. For example, decode units 20A–20C may be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18, which comprises an early decode unit (EDU) 44, is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. MROM unit 34, which also comprises an early decode unit (EDU) 42 is coupled to decode units 20 and FPU 36. Finally, FPU 36 is coupled to load/store unit 26 and reorder buffer 32.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in a 4-way set associative structure having 32-byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 may predict the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented in a fully-associative, set-associative, or direct-mapped configuration.

Instructions are fetched from main memory and stored into instruction cache 16 by prefetch/predecode unit 12. Instructions may be prefetched prior to the request thereof in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction may be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| Start bits | 10000 |
|---|---|
| End bits | 00001 |
| Functional bits | 11000 |

According to one particular embodiment, early identifying that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which case subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18 and MROM unit 34. As instructions are fetched from instruction cache 16, the corresponding predecode data is scanned to provide information to instruction alignment unit 18 and MROM unit 34 regarding the instructions being fetched. Instruction alignment unit 18 utilizes the scanning data to align an instruction to each of multiplexers 46A–C. In one embodiment, instruction alignment unit 18 aligns instructions from three sets of eight instruction bytes to decode units 20. Similarly, MROM unit 34 is configured to output up to three aligned instructions to multiplexers 46A–C. Both instruction alignment unit 18 and MROM unit 34 may each have an early decode unit (EDC) 42 and 44. These units may perform the first steps of the decoding process, e.g., identifying the operand specifiers for each instruction.

Each multiplexer 46A–C is configured to receive a partially decoded instruction (and corresponding decode and predecode information) from instruction alignment unit 18 and MROM unit 34. Each multiplexer 46A–C is configured to select up to one instruction from either instruction alignment unit 18 or MROM unit 34 during each clock cycle. The selected instructions are routed to decode units 20A–C (integer instructions), and FPU 36 (floating point, MMX, and 3D instructions). In one embodiment of microprocessor 10, up to three floating point instructions per clock cycle may be conveyed to floating point unit 36. As noted above, the instructions may come from MROM unit 34 (microcode instructions) or instruction alignment unit 18 (fast path instructions).

Decode units 20 are configured to complete decoding instructions received from multiplexers 46A–C. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 4, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage location is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if both: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in pro gram order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Floating Point Unit

Figure 5:
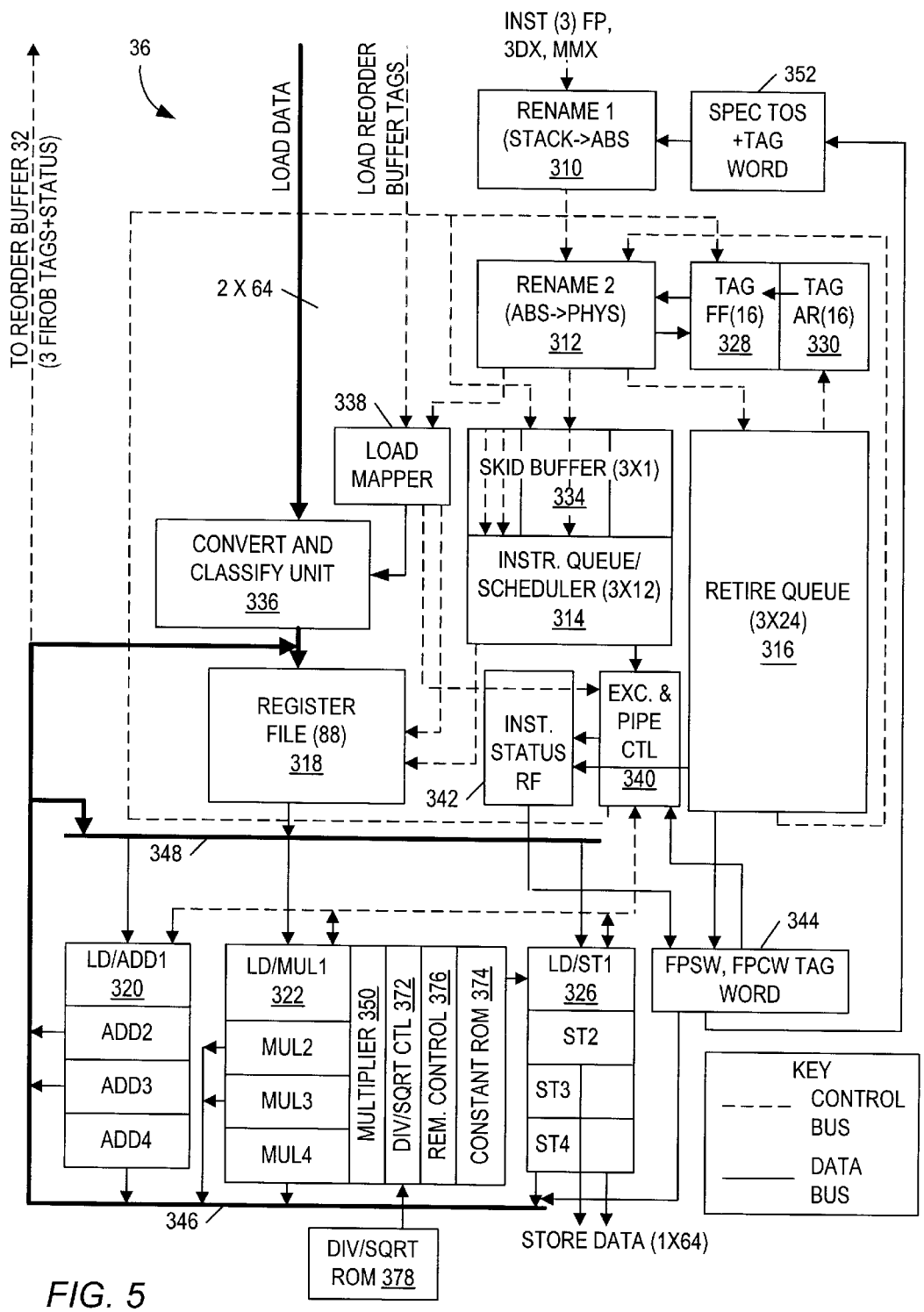
FIG. 5 is a diagram illustrating one embodiment of a floating point unit.

Turning now to FIG. 5, details of one embodiment of FPU 36 are shown. FPU 36 is a high performance out-of-order execution unit capable of accepting up to three new instructions per clock cycle. The three instructions may be any combination of x86 floating point instructions, MMX instructions, or 3DX instructions. MMX and 3DX instructions are extensions to the standard x86 instruction set One example of a 3DX instruction set extension is the 3DNow!™ extension from Advanced Micro Devices, Inc. MMX instructions are geared toward multimedia and two-dimensional graphic applications, while 3DX instructions are optimized for performing three-dimensional graphic manipulations such as rendering and texture mapping. Many 3DX instructions are vectored instructions that perform the same operation on a number of independent pairs of operands.

As the figure illustrates, this embodiment of FPU 36 comprises the following components: a rename-1 unit 310, a rename-2 unit 312, an instruction queue 314 (also referred to as scheduler 314), a retire queue 316, a register file 318, a load/add instruction pipeline 320, a load/multiply instruction pipeline 322, a load/store instruction pipeline 326, a skid buffer 334, a convert and classify unit 336 and a load mapper 338. Rename-1 unit 310 is coupled to rename-2 unit 312 and is configured to receive a speculative top of stack (TOS) tag and tag word 352. Rename-2 unit 312 is coupled to future file tag array 328, architectural tag array 330, retire queue 316, skid buffer 334, instruction queue 314, and load mapper 338. Convert and classify unit 336 is also coupled to load mapper 338, which in turn is coupled to execution and pipe control unit 340 along with instruction status register file 342 and instruction queue 314. Register file 318 receives inputs from convert and classify unit 336, load mapper 338 and instruction queue 314, and outputs data to source operand bus 348. Source operand bus 348 is in turn coupled to instruction pipes 320, 322, and 326. Finally, instruction pipes 320, 322, and 326, and floating point status/control/tag words 344 are all coupled to result bus 346. While floating point status/control/tag words 344 and speculative top of stack and tag word 352 are shown separately in the figure for explanatory purposes, these tags may be stored together with future file tags 328 and architectural register tags 330 in a single storage location, e.g., within register file 318, execution and pipe control unit 340, or retire queue 316.

Rename-1 unit 310 receives up to three instructions per clock cycle. As previously noted, these may be any combination of floating point, MMX, or 3DX instructions. Rename-1 unit 310 converts stack-relative register operands into absolute register operands. The x86 instruction set and architecture defines eight floating point registers that are accessed in a stack-like manner (i.e., relative to a top-of-stack pointer). Rename-1 unit 310 also assigns each instruction to one of three instruction pipelines, either load/store pipeline 326, add pipeline 320, or multiply pipeline 322.

Rename-2 unit 312 performs true register renaming. Upon receiving the instructions from rename-1 unit 310, rename-2 unit 312 reads three registers from a "free list" of the available registers stored within retire queue 316. Once the registers have been read, rename-2 unit 312 assigns one to the destination register of each instruction. To rename the source registers, rename-2 unit 312 indexes tag future file 328 using the absolute register number for each source register. Tag future file 328 stores tags that identify which registers store the current speculative future state of each of the sixteen architectural registers in FPU 36. Similarly, architectural register tag file 330 stores tags which identify which registers within register file 318 store the current architectural (non-speculative) state of FPU 36. Of the sixteen registers that define FPU 36's state (architectural or speculative), eight are architectural registers (i.e., floating point stack or MMX registers) and eight are micro-architectural registers (i.e., registers that store internal state information that is not generally accessible to the programmer). The old destination registers are then read from the tag future file 328 and written to the tail of the free list Finally, tag future file 328 is updated by storing tags for the new destination registers.

Memory operands may be handled by assigning them the same register tag as the destination register. This is because load data will be converted and directly written into the destination register when it is received from load/store pipeline 326. In the case of an FLD instruction, no further execution is required, although the FLD instruction is still assigned to an execution pipeline for the purpose of signaling completion to reorder buffer 32.

Once the three instructions have passed through rename-1 unit 310 and rename-2 unit 312, the instructions are represented in a three operand format (i.e., first source operand, second source operand, and destination operand). While the first source operand is always a register operand, a bit in the opcode may be used to indicate whether the second operand is a register operand or a memory operand.

From rename-2 unit 312 the instructions are passed to instruction queue 314, where the three instructions are allocated a "line" of storage. If instruction queue 314 is full, the instructions may be stored in skid buffer 334 until such time as there is room within instruction queue 314. After receiving the three instructions, instruction queue 314 snoops result bus 346 and source operand bus 348. Concurrently with allocating the line of storage and snooping, retire queue 316 allocates one entry for each instruction. The entries store the destination register tags, the absolute destination register number, and the old destination register number. Additional information may also be included, e.g., information that may be needed to update the architectural state at retire time.

On the cycle following their entry into instruction queue 314, the instructions are available for scheduling. Instruction queue 314 examines all of the stored instructions and issues the oldest instructions which meet the following criteria: (1) the instruction pipe to which the instruction has been assigned is available, (2) the result bus for that instruction pipe will be available on the clock cycle in which the instruction will complete (this is dependent upon the latency of the particular instruction), (3) the instruction's source registers and or memory operands are available, and (4) other serialization checks. In this embodiment, instruction queue 314 may schedule up to three instructions per clock cycle. Each of the three instruction pipes 320, 322, and 326 may accept a new instruction every clock cycle. Other embodiments capable of scheduling four or more instructions are also possible and contemplated.

Once three contiguous entries are scheduled, those three entries are free to be compacted out of instruction queue 314. When the instructions are conveyed from instruction queue 314 to their respective instruction execution pipelines, their source operands are read. In some cases, the source data will come from a register, while in other cases the source data will come from a "bypass". A bypass refers to the practice of result forwarding. Result forwarding involves conveying the results from a recently executed instruction directly to other instructions that depend upon that result. Using result forwarding allows the result to be used in subsequent instructions without having to wait for the result to be stored in a register and then read from the same register.

Each instruction execution pipe 320, 322, and 326 may be configured as a four-stage pipeline. In the first stage of each pipeline, the result buses are read and the input data is taken from either the source operand bus (if the data is within register file 318) or the result bus (if a bypass is being performed). Once the source data has been received, each instruction pipe may begin performing the appropriate computation.

In the embodiment shown in the figure, instruction pipe 320 is configured to perform load and addition operations, instruction pipe 322 is configured to perform load and multiplication operations, and instruction pipe 326 is configured to perform load and store operations. Both instruction pipes 320 and 322 may be configured to perform certain MMX instructions. Instruction pipe 322, which comprises multiplier 350, may also be configured to perform iterative calculations that involve multiplication, e.g., reciprocal operations, division operations, and square root operations, under the control of control unit 372, division/square root ROM 378, and, if a remainder is called for, remainder control unit 376. Constant ROM 374 is a read only memory configured to store a plurality of constants that may be used to calculate initial values for these iterative calculations. Division/square root ROM 378 is a read only memory which stores sequence information for division and square root functions, as described in greater detail below. In some embodiments, control unit 372 may be part of execution and pipe control unit 340.

In some cases, instruction operands or the results generated by executing an instruction may be too small to fit within the operand or result's standard data format These numbers are referred to as "denormals". While normalized floating point values have a non-zero exponent and a one in the most significant bit of the significant, i.e., the bit directly to the left of the binary radix point (e.g., 1.001010 . . . ), denormals are represented with a zero exponent and a zero in the most significant bit of the significant (e.g., 0.000101 . . . ). Denormal load data is detected and tagged by convert and classify unit 336. Denormal results generated by during execution within instruction pipes 320, 322, and 326 are tagged when they are generated. Execution and pipe control unit 340 detects the presence of the denormal tags and calls an appropriate microcode routine from MROM 34 to handle the denormal data At the end of the final execution stage, the data is placed on result bus 346. This makes the result data available for an instruction entering the first stage of one of the instruction execution pipelines during the next clock cycle. Once the data is on the result bus, it may also be written into register file 318. Instead of being stored in register file 318, store data is sent to the load/store unit 26. The reorder buffer tag and any exception information is sent back to reorder buffer 32. At this point, the instructions are complete. However, they are still speculative. When the instructions reach the bottom of reorder buffer 32 (assuming there is no branch misprediction or exception abort), reorder buffer 32 notifies FPU 36 that the instructions should be retired. The speculative state of the floating point unit 36 is committed to the architectural state when retire queue 316 updates the tags for the architectural register file 328, and the destination register tags in retire queue 316 are written to the architectural register file 318.

Convert and classify unit 336 receives all load data, classifies it by data type, and converts it to an internal format if necessary. In one embodiment, convert and classify unit 336 appends a three bit classification tag to each data item. The three bit tag classifies the accompanying data as one of the following eight potential data types: (1) zero, (2) infinity, (3) quiet NaN, (4) signaling NaN, (5) denormal, (6) MMX, (7) normal, or (8) unsupported. NaN is a standard abbreviation for "Not-a-Number". While representations may vary across different implementations, zero data types are typically represented with a zero exponent and a zero significant. Similarly, infinity data types are typically represented with an exponent comprising all asserted ones. A quiet NaN ("QNaN") is generated whenever a floating point instruction causes an invalid operation, e.g., a square root operation on a negative number. A signaling NaN ("SNaN"), unlike a quiet NaN, generates an exception when used. Signaling NaNs are not generated by FPU 36 and are typically only used by programmers to signal particular error conditions. The table below illustrates the characteristics of each data type for x86 compatible floating point units (wherein "x" represents either a one or a zero):

| Sign | Exponent | Significand | Value |
|---|---|---|---|
| x | $00 \ldots 00_2$ | $0.00 \ldots 00_2$ | Zero |
| x | $11 \ldots 11_2$ | $1.00 \ldots 00_2$ | Infinity |
| x | $11 \ldots 11_2$ | $1.1xx \ldots xx_2$ | QNaN |
| x | $11 \ldots 11_2$ | $1.0xx \ldots xx_2$ | SNaN |
| x | $00 \ldots 00_2$ | $0.xx \ldots xx_2$ | Denormal |

MMX data types are 64 bits wide and comprise either eight packed 8-bit bytes, four packed 16-bit words, or two packed 32-bit double-words. One possible way in which MMX data types may be detected is by the MMX opcodes which precede them. Normal data types are standard floating point values that are either single precision, double precision, or extended precision (before they are translated into an internal data format) and that do not have the characteristics of any of the previously described data types. Unsupported data types are extended precision bit patterns that do not fall into any of the previously described data types and that fall outside of the normal data type as defined by IEEE Standard 754. For example, an extended precision bit sequence having a 0 sign bit, a biased exponent of 11 . . . 11, and a significant in the format (f.ff . . . ff) of 0.11 . . . 11 is an unsupported value. Note, however, in other embodiments larger or smaller classification tags and additional or fewer data types may be implemented.

The data types and exemplary formats illustrated above describe the data as it is received and identified by convert and classify unit 336. Once convert and classify unit 336 classifies the data, the classification tag may be used to identify some or all of the data's properties. For example, if a value is classified as a zero, it may be identified solely by its classification tag instead of having to perform a wide comparison of each bit in the exponent and significant portions of the value. The classification tags may accompany the data throughout FPU 36 and may be stored in register file 18 along with the data.

As discussed above, when data from a load instruction is received by FPU 36, the data is routed to convert and classify unit 336. A corresponding reorder buffer tag accompanies the data and is routed in parallel to load mapper 338. As previously noted in the description of microprocessor 10, the reorder buffer tag identifies the sequence in which out of order instructions should be retired (i.e., committed to architectural state). For load instructions, the reorder buffer tag follows the data from load/store unit 26 to FPU 36. Load mapper 338 receives the reorder buffer tag and translates it into a data register tag. The data register tag indicates which data register within register file 318 the corresponding data is to be loaded into.

Execution and pipe control unit 340 tracks the status of each stage in instruction pipes 320, 322, and 326. Execution and pipe control unit 340 contains timing information enabling it to determine the future availability of each instruction pipe. For example, when an FMUL (floating point multiply) instruction begins execution in multiplication instruction pipe 322, control unit 340 uses its stored timing information to notify instruction queue 314 that the result will be available for output on result bus 346 four clock cycles later. This timing information allows instruction queue 314 to efficiently schedule instruction for execution in instruction pipes 320, 322, and 326. Control unit 320 also tracks the status of each pipe stage, receiving and prioritizing exceptions from instruction pipes 320, 322, and 326.

FPU status word, control word, and tag word (collectively, words 344) are stored within retire queue 316. In one embodiment register file 318 may comprise 88 registers, i.e., 16 registers to store the current architectural state of FPU 36 (see below), and 72 speculative registers to store the speculative state of FPU 36. Of the 72 speculative registers, 16 of them store the "current" speculative state. Of each set of 16 registers that store a particular state of FPU 36 (whether the state is architectural or speculative), eight registers are FPU stack registers and eight registers are micro-architectural registers that store state information that is only accessible to microcode instructions within FPU 36, i.e., the registers are not accessible to the programmer and store only internal state information. In one embodiment, each register in register file 314 is 90 bits long, with 87 bits providing storage for internal format data (e.g., one sign bit, 18 exponent bits, and a 68-bit significant) and 3 class bits.

Instruction status register file (SRF) 342 stores information for execution and pipe control unit 320. As a result of instructions executing out of order in FPU 36, exceptions that occur within instruction pipes may need to be stored until the instructions generating them are the next to be retired. Retire queue 316 reads instruction status register file 342 when it retires instructions and updates the architectural floating point status word (FPSW) and floating point control word (FPCW) and tag word (collectively, 344) accordingly. This information is conveyed to rename-1 unit along with the current speculative top of stack 352 and on result bus 346.

Fast Compaction of Instruction Queue

Figure 6A:
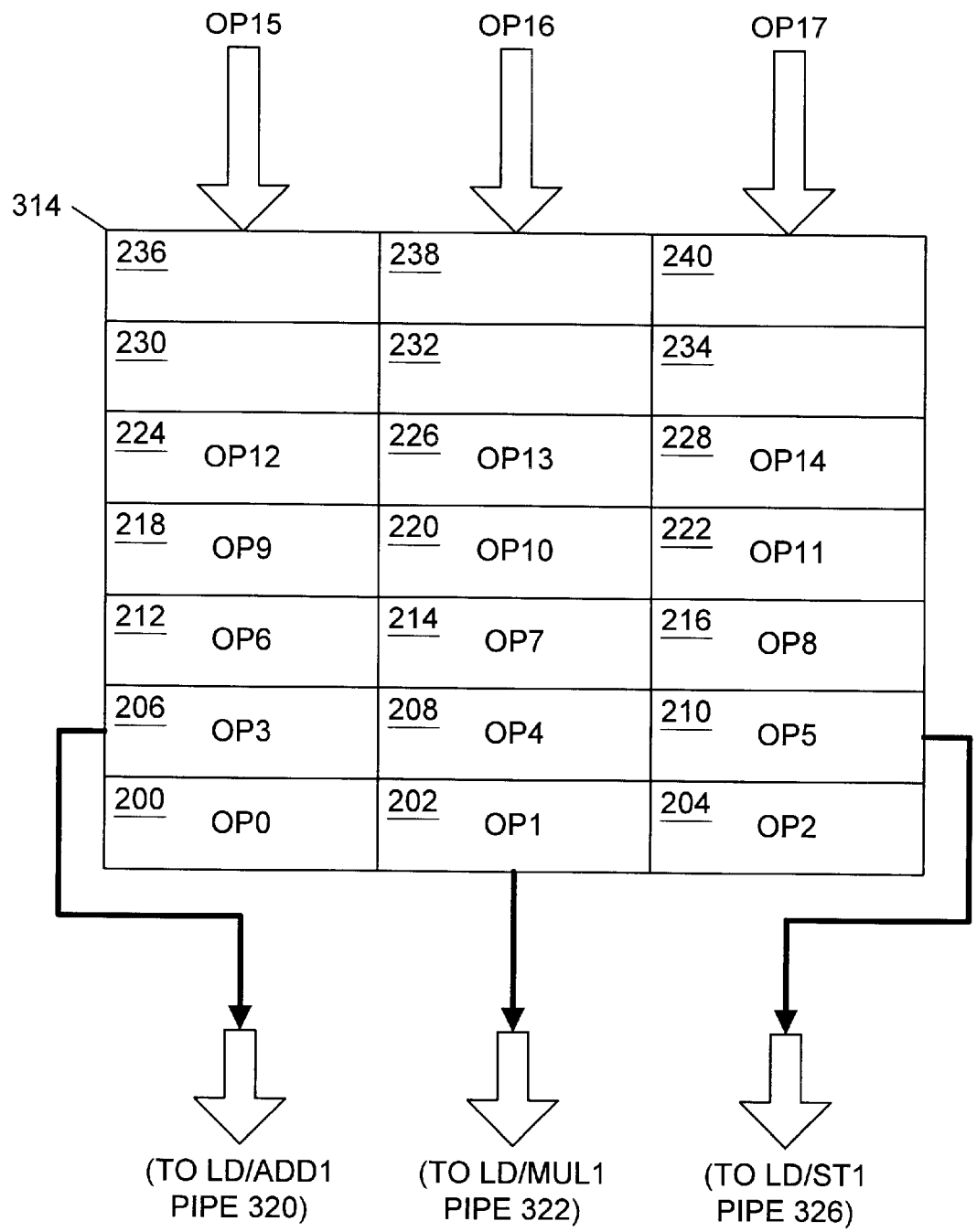
FIG. 6A illustrates one embodiment of an instruction queue.

Turning now to FIG. 6A, one embodiment of instruction queue 314 is shown. In this embodiment, instruction queue 314 is configured to receive and output up to three instructions per clock cycle. Note, however, that other configurations are also possible (e.g., a configuration receiving up to four instructions per clock cycle and outputting up to two instructions per clock cycle). The instructions may be output in an out-of-order fashion to improve instruction throughput. In the embodiment shown, each instruction output by instruction queue 314 is conveyed to one of three instruction execution pipelines (e.g., load/add pipeline 320, load/multiply pipeline 322, and load/store pipeline 326 from FIG. 5). For example, the figure shows instruction OP3 being dispatched to load/add pipe 320, instruction OP1 being dispatched to load/multiply pipe 322, and instruction OP5 being dispatched to load/store pipe 326. As can be seen from the figure, these instructions are dispatched out of order (wherein instruction OP0 is the "oldest" instruction in instruction queue 314 and instruction OP14 is the "newest" instruction in instruction queue 314). Note, however, that any instruction may be dispatched to any execution pipeline (i.e., there need be no correlation between storage locations and functional pipelines). For example, instruction OP0 could be a multiplication instruction and could be dispatched to load/multiply pipe 322.

As can be seen from the figure, instructions OP15–OP17 will be stored into instruction queue 314 during the next clock cycle. Similarly, instructions OP1, OP3, and OP5 will be dispatched to functional pipelines 320–326.

Figure 6B:
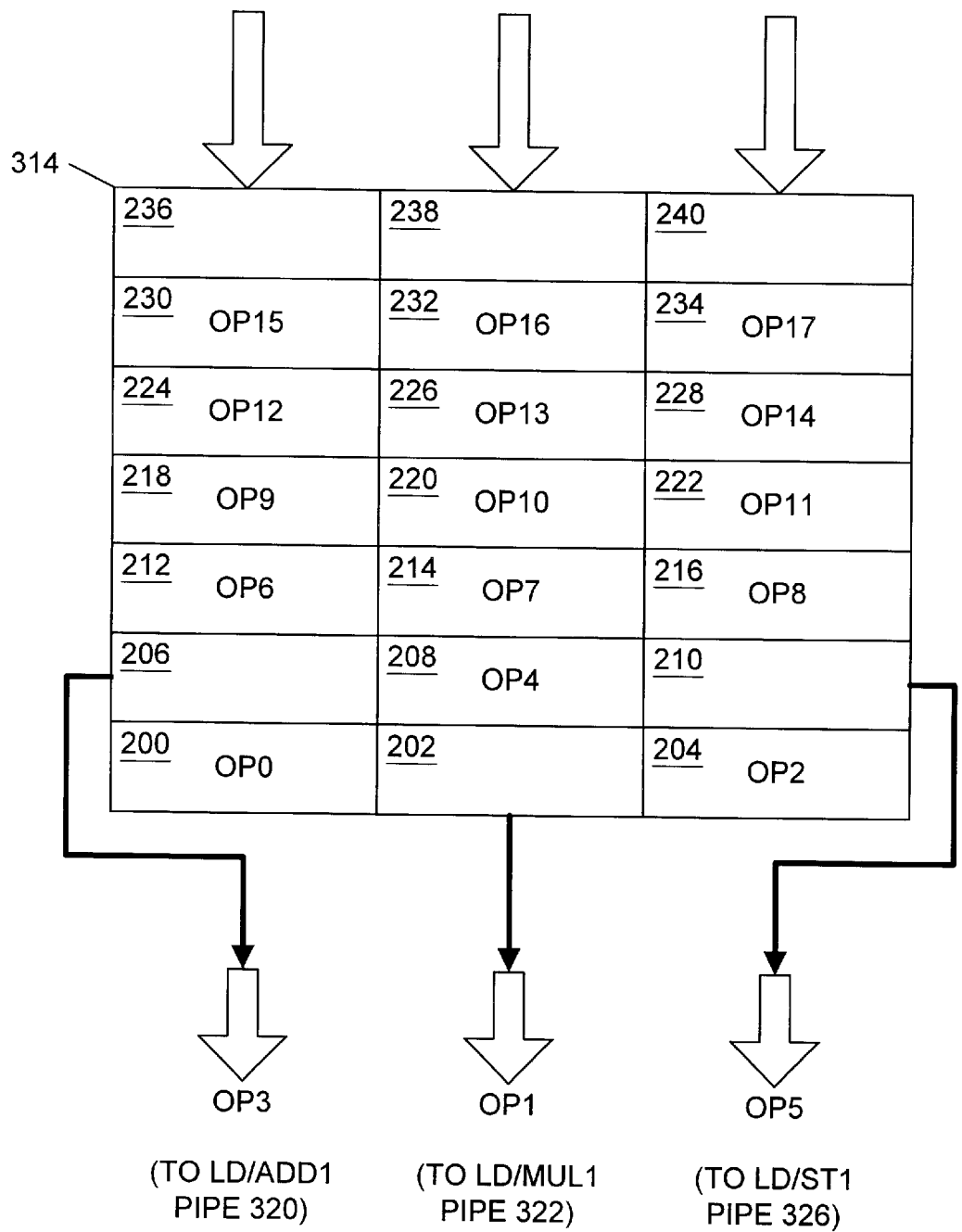
FIG. 6B illustrates one embodiment of the instruction queue from FIG. 6A a fraction of a clock cycle later.

Turning now to FIG. 6B, instruction queue 314 is shown a fraction of a clock cycle later. As the figure illustrates, instructions OP1, OP3, and OP5 have been written to functional pipes 320–326. Similarly, instructions OP15–OP17 have been stored into instruction queue 314. The outputting of instructions OP1, OP3, and OP5 creates empty storage locations or "gaps" within instruction queue 314 (clear bits may be associated with each storage location to track whether the storage location is full or empty). To fill these gaps, instruction queue 314 is configured to shift the instructions remaining in queue 314 after OP1, OP3, and OP5 have been dispatched to the functional pipelines.

A variety of methods may be used to control the shifting of instructions within instruction queue 314. Each method is described in detail below.

Full Compaction—Prior Art

Figure 7A:
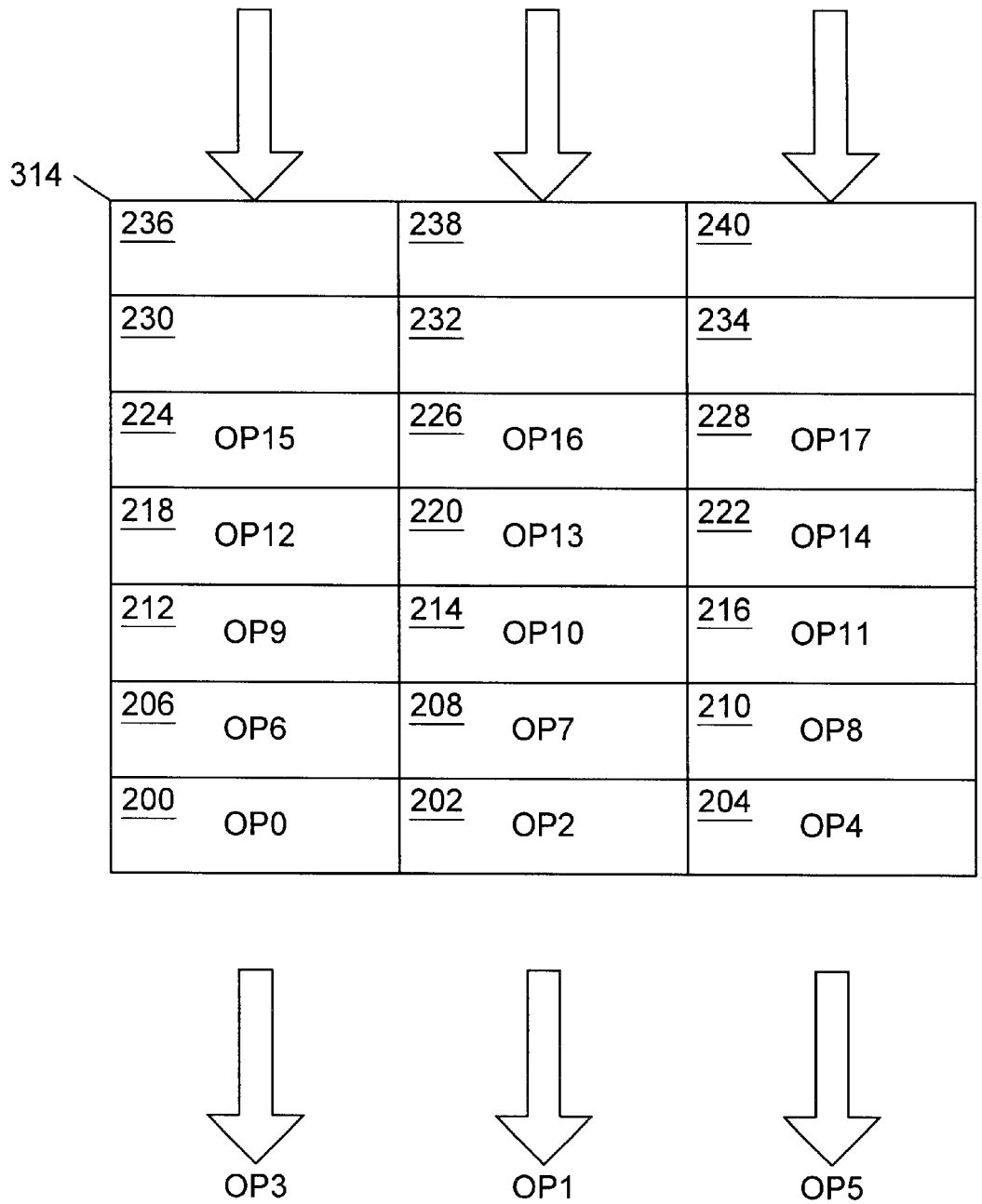
FIG. 7A illustrates one embodiment of an instruction queue configured to perform full compaction.

Turning now to FIG. 7A, one embodiment of instruction queue 314 configured to perform full compaction is shown. Full compaction allows each instruction stored within instruction queue 314 to be shifted a variable number of storage locations (for example 0, 1, 2, or 3 storage locations). In this embodiment, instruction OP0 shifts zero storage locations, while instruction OP2 shifts one storage location. Similarly, instruction OP4 shifts two storage locations (i.e., from storage location 208 to storage location 204). Instructions after instruction OP8 (i.e., instructions OP9 and higher) are each shifted three storage locations). Full compaction may allow the greatest flexibility in shifting each individual instruction remaining in instruction queue 314 after dispatch. Full compaction may however, have its draw backs. In particular, the control logic for shifting each instruction may be fairly complex.

Figure 7B:
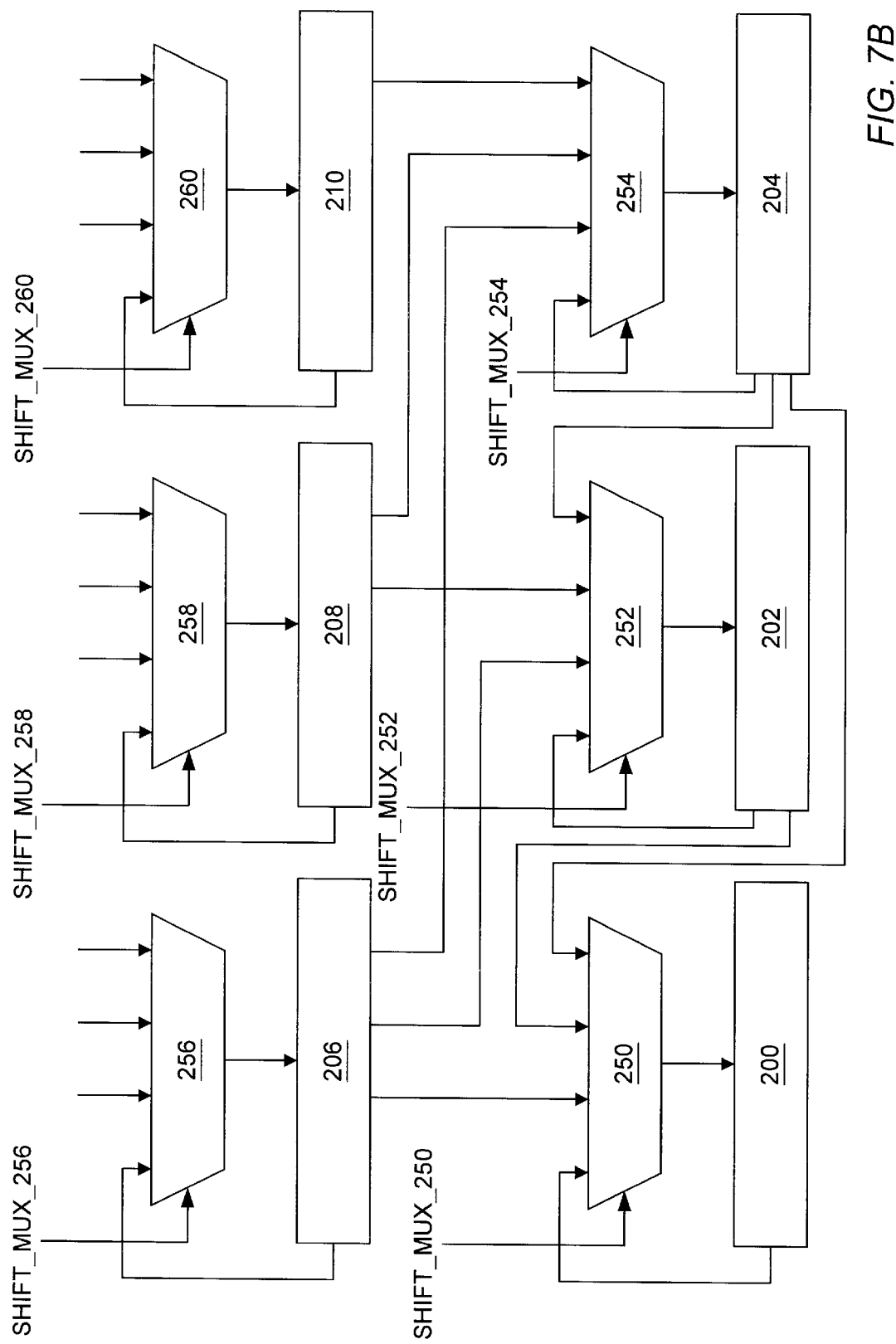
FIG. 7B is a diagram illustrating one embodiment of shifting logic.

Turning now to FIG. 7B, a diagram illustrating the shifting logic for instruction storage queue 314 is shown. As the figure illustrates, each storage location (e.g., storage locations 200–210) is coupled to a multiplexer 250–260. Each multiplexer 250–260 is configured to select one input that will be stored into the corresponding storage location at the conclusion of the shifting or compaction process. Since each instruction is allowed to shift either 0, 1, 2, or 3 storage locations, each multiplexer receives four inputs. For example, multiplexer 254 is configured to select the instruction for storage in storage location 204. Multiplexer 254 may select one of the following four inputs: (1) the contents of storage location 204; (2) the contents of storage location 206; (3) the contents of storage location 206; or (4) the contents of storage location 210. Similarly, multiplexer 250 is configured to select from the contents of instruction storage locations 200, 202, 204, and 206. As previously noted, this complexity and the associated control logic may reduce the performance of instruction queue 314 in some embodiments.

Aligned Compaction

Turning now to FIG. 8A, a portion of another embodiment of instruction queue 314 is shown. In this embodiment, instruction queue 314 is configured to use "aligned compaction". Aligned compaction shifts instructions only when an entire row of storage locations within instruction storage queue 314 is empty. For example, if instruction storage locations 200, 202, and 204 are empty, then control signal SHIFT_ROW_1 may be asserted, thereby causing multiplexers 250, 252, and 254 to select the contents of storage locations 206, 208, and 219, respectively, for storage in storage locations 200–204. This shifts the contents of storage locations 206–210 down one column.

Turning now to FIGS. 8B–8C, one embodiment of aligned compaction is illustrated. FIG. 8B illustrates instruction queue 314 before aligned compaction. FIG. 8C illustrates instruction queue 34 after compaction. Once instructions OP3–OP5 are output from instruction queue 314, an entire row (i.e., storage locations 206–208) is empty. Thus, instruction queue 314 may perform aligned compaction to shift the contents of storage locations 212–234 one row (i.e., three storage locations).

Stated another way, aligned compaction shifts instructions only when an aligned string of N empty contiguous storage locations is present in instruction queue 314. As used herein, N is an integer value greater than one that corresponds to the number of storage locations in each row of instruction queue 314. A string of contiguous storage locations is "aligned" when the string comprises at least one full row of instruction queue 314. For example, once instructions OP3, OP4, and OP5 are output, empty storage locations 206, 208, and 210 form an aligned string of three empty contiguous storage locations (i.e., N equals three). The term "string" is used herein to refer to a group of N or more logically sequential empty storage locations.

Advantageously, implementing aligned compaction may reduce the size of multiplexers. 250–254 when compared with full compaction (i.e., from four inputs each to two inputs each). The number of control signals required is also reduced. This reduction in the number of inputs may advantageously translate into a corresponding reduction in die space and timing requirements. Aligned compaction does, however, have some drawbacks.

Figure 8D:
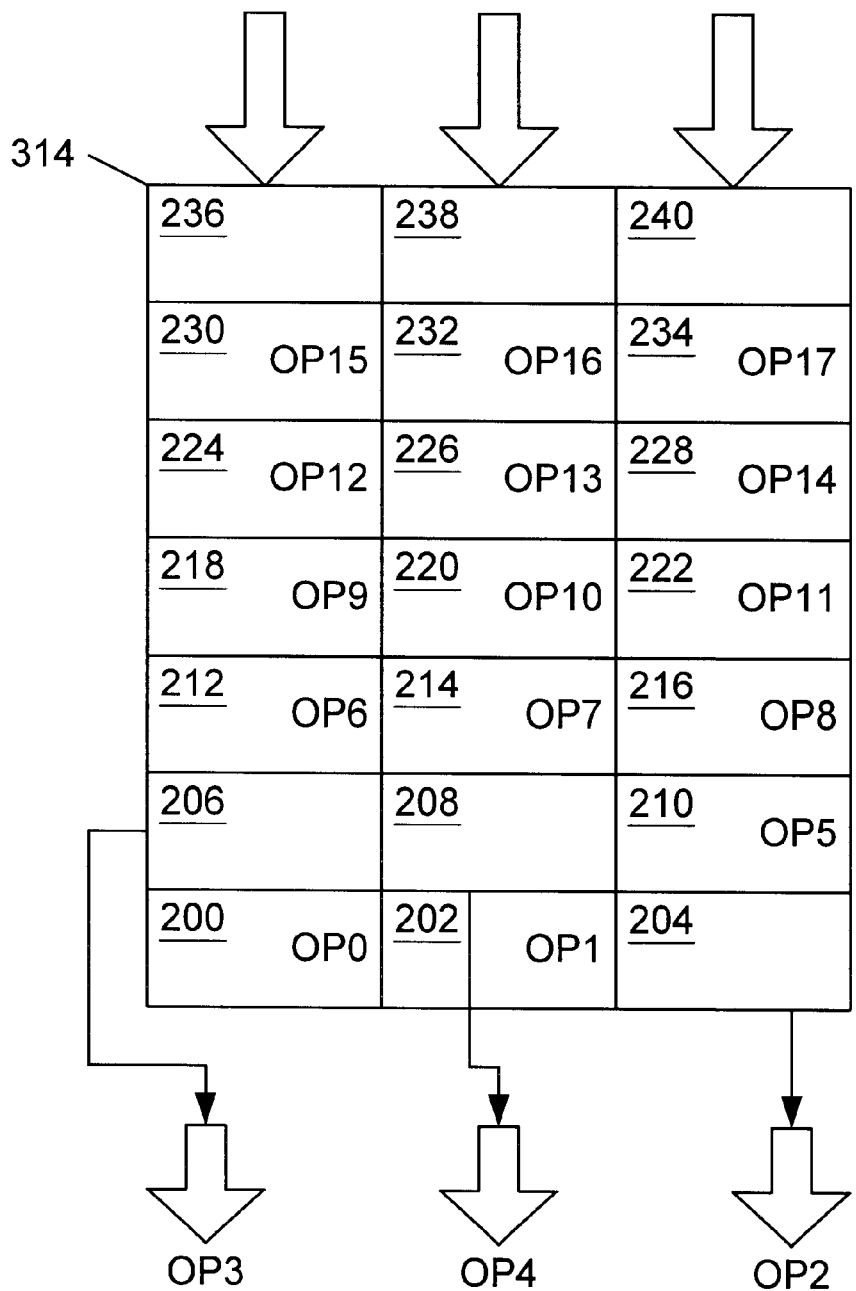
FIG. 8D illustrates a potential drawback of aligned compaction.

Turning now to FIG. 8D, one such drawback is illustrated. In particular, no compaction takes place if there are one or more strings of N empty contiguous storage locations that are unaligned. As shown in the figure, instructions OP2–OP4 are output by instruction queue 314, thereby creating a string of three empty contiguous storage locations (i.e., storage locations 204–208). This string is unaligned, however, because it does not comprise an entire row. Thus, this embodiment of instruction queue 314 may be unable to compact these empty storage locations until instruction storage locations 200, 202, and 210 are emptied. This failure to compress out the gaps created by empty storage locations may result in instruction queue 314 running out of available storage location. As previously noted, this is undesirable as it may lead to stalling of function pipelines 320–326.

Unaligned Compaction

Figure 9A:
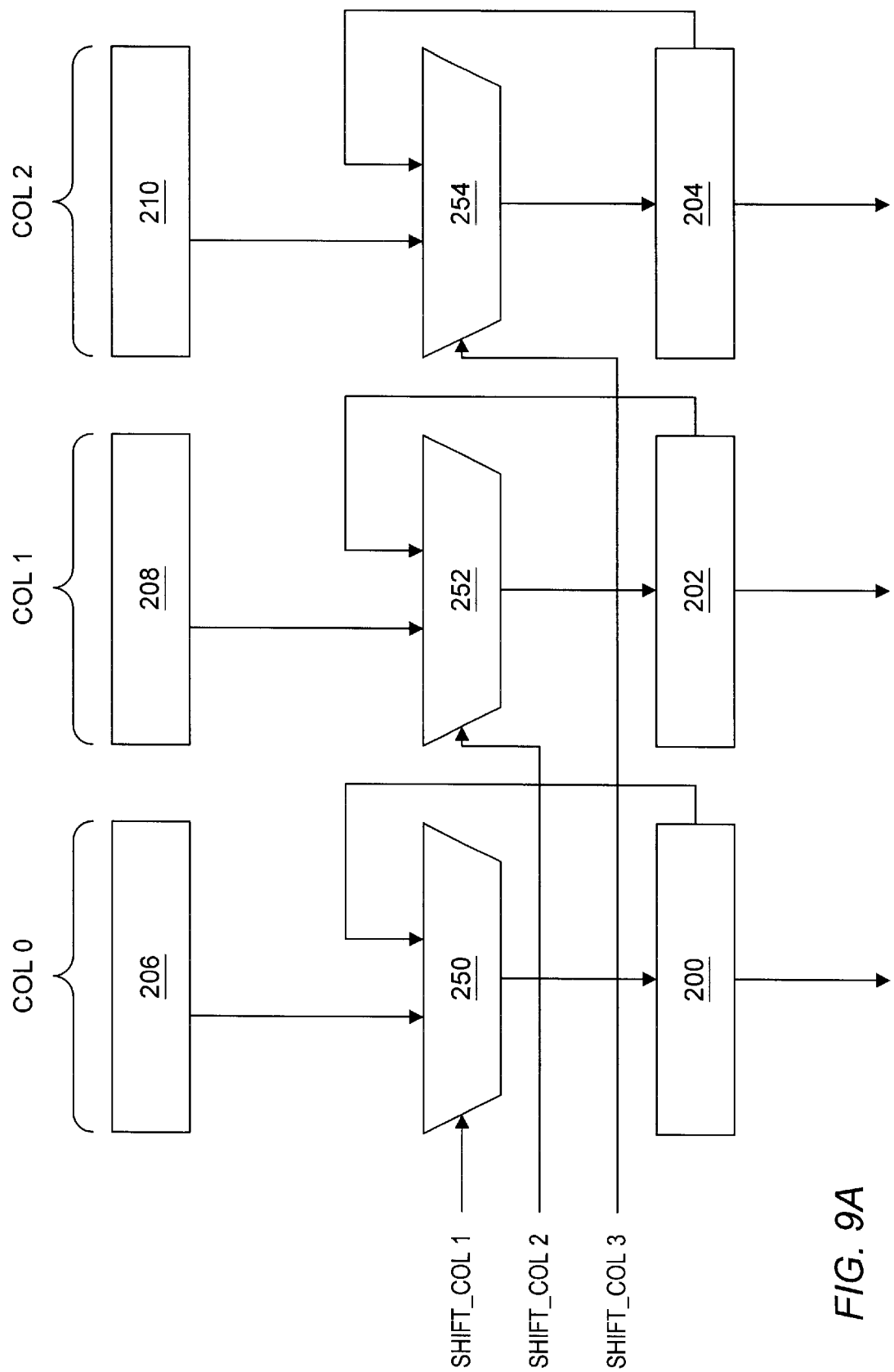
FIG. 9A illustrates another embodiment of an instruction queue.

Turning now to FIG. 9A, another embodiment of instruction queue 314 is shown. In this embodiment, instruction queue 314 is configured to perform "unaligned compaction" to compress out the empty storage locations or gaps. Each instruction remaining within instruction cache 314 after an output cycle are shifted by either zero or three storage locations (as with unaligned compaction). However, as the figure illustrates, each column is controlled separately. Advantageously, this configuration may have a greater likelihood of compressing out gaps than aligned compaction while still using less hardware and die space than full compaction (e.g., two-input multiplexers instead of four-input multiplexers).

The hardware configurations illustrated in the figures and examples herein are merely one of many possible implementations and are not meant to be limiting. For example, flip-flops or registers and buffers could be used in lieu of multiplexers 250–254. In some embodiments, the storage locations at the top of instruction queue 314 may be coupled to a buffer (e.g., skid buffer 334 in FIG. 5) or directly to multiplexers 46A–C (see FIG. 4).

Figure 9B:
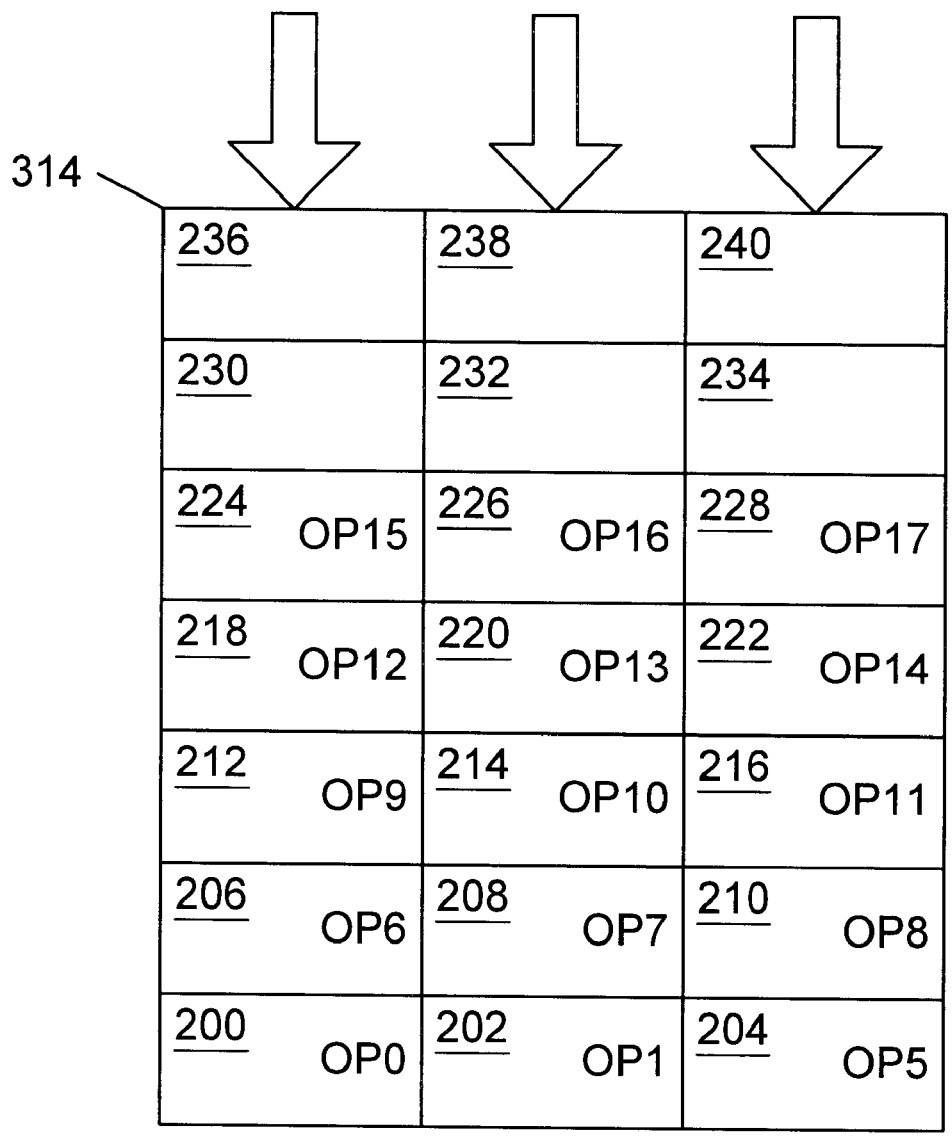
FIG. 9B illustrates an example of one embodiment of unaligned compaction.

Turning now to FIG. 9B, one example of unaligned compaction is shown. This example illustrates the compaction of instruction queue 314 after instructions OP2, OP3, and OP4 are output (see FIG. 8D). Once these instructions are output, unaligned compaction allows instruction queue 314 to compress out the gap created by the string of three empty contiguous instruction storage locations, even thought they are not aligned with the beginning of a row. Thus, unaligned compaction allows each instruction to be shifted either 0 or N positions (wherein N equals three in the examples shown). As shown in the figure, instruction OP5 shifts three positions (from location 210 to location 204). Instructions OP6–OP17 also shift their positions by three storage locations, while instructions OP0 and OP1 shift by zero positions (i.e., they remain in storage locations 200 and 202, respectively).

While the examples provided herein illustrate instruction queue 314 as receiving and dispatching up to three instructions per clock cycle, other configurations are possible and contemplated. For example, instruction queue 314 may be configured to receive up to four or more instructions per clock cycle while dispatching up to two instructions per clock cycle. Similarly, instruction queue 314 may be configured to receive up to three instructions per clock cycle while dispatching up to four instructions per cock cycle. Furthermore, aligned and unaligned compaction implementations may allow each instruction to shift either zero to N instruction storage locations per compression cycle, wherein N is an integer greater than two. Depending upon the embodiment, the value N need not have a direct relationship to the maximum number of instructions input or output from instruction queue 314. For example, it may be possible to implement instruction queue 314 so that it may receive up to two instructions per clock cycle, output up to four instructions per clock cycle, and shift remaining instructions by either zero or three storage location positions.

Figures 9C, 9D:
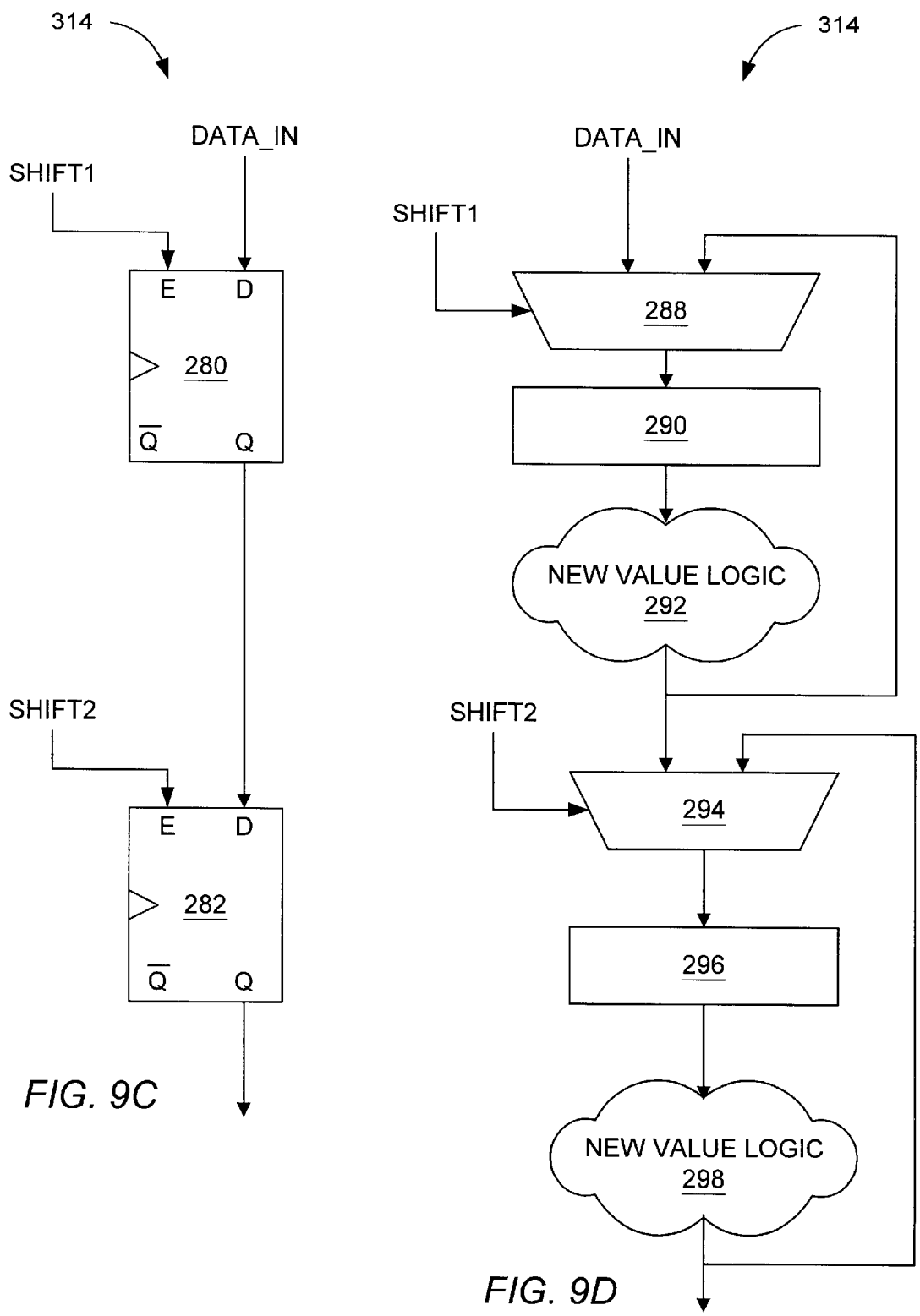
FIG. 9C illustrates an alternate embodiment of a queue.
FIG. 9D illustrates an alternate approach for a data queue.

Turning now to FIGS. 9C and 9D, details of two alternate embodiments of instruction queue 314 are shown. In FIG. 9C, two flip-flops 280 and 282 are used in place of multiplexers and registers. To perform compaction, control signal SHIFT2 is asserted, thereby latching the contents from flip-flop 280's Q output into flip-flop 282. While this may work well for data or instructions that are being shifted without change, FIG. 9D illustrates an alternate approach for data that may change from one cycle to another. Data is received by multiplexer 288 and is forwarded to storage register 290. Storage register 290 allows the data to flow through to new value calculation logic 292. Logic 292 manipulates the data and provides a feedback path to multiplexer 288. If the data is data is not being shifted (i.e., compacted), then multiplexer 288 selects the results on the feedback path, which may have been altered. This configuration may be particularly useful for status bits associated with the data.

Figure 10:
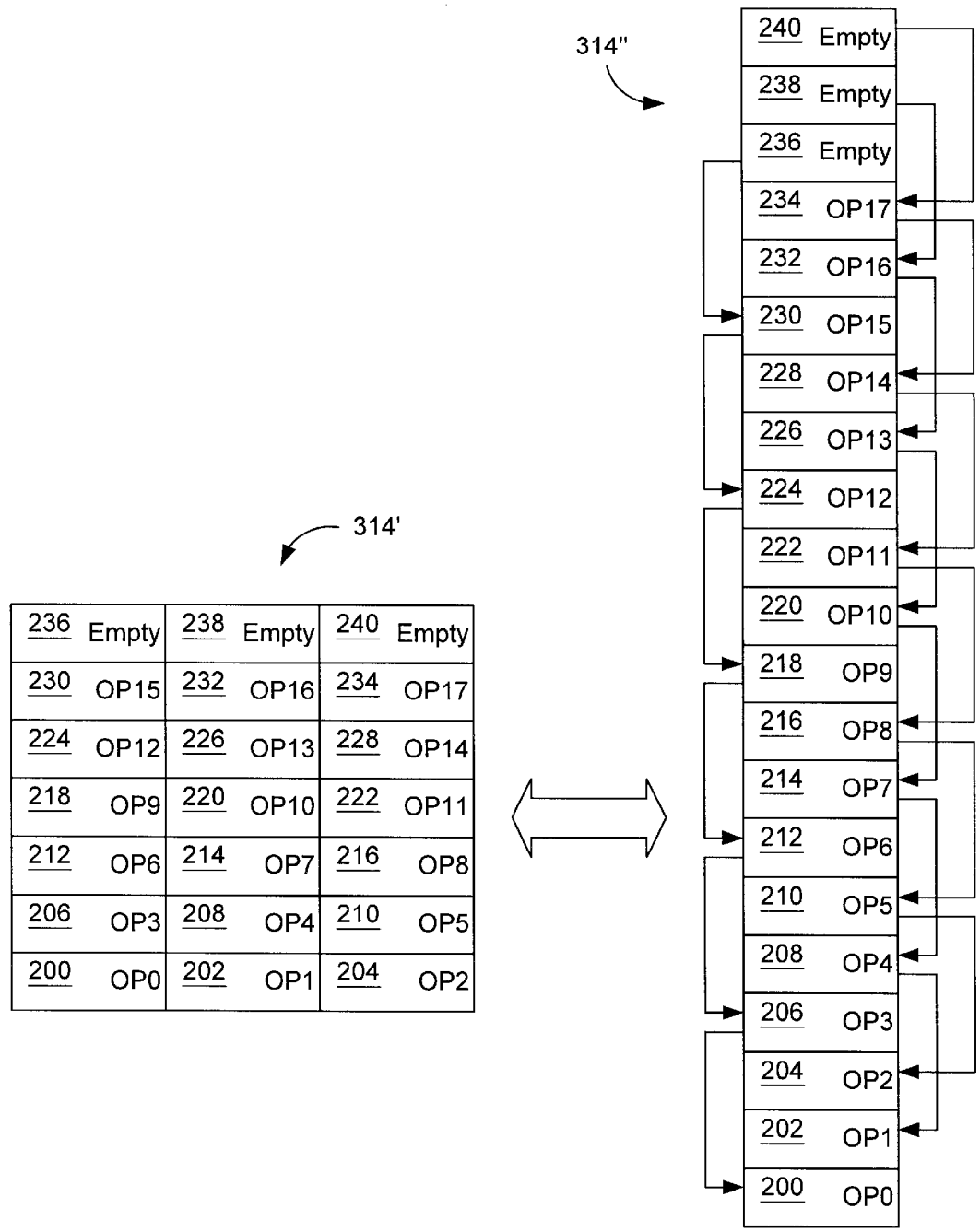
FIG. 10 illustrates two different representations of one embodiment of an instruction queue.

Turning now to FIG. 10, two different representations of instruction queue 314 are shown. Representation 314' depicts the queue as a two-dimensional array, while representation 314" depicts the queue as a one-dimensional linear array. Both representations depict the same instruction queue. For example, the arrows in representation 314" represent the shifting pattern for unaligned compaction assuming N equals three. Thus, instruction OP5 may shift, either zero positions (remaining ins storage location 210) or three positions (to storage location 204). To highlight the differences between full compaction, aligned compaction, and unaligned compaction, the two-dimensional array representation 314' was used because more clearly depicted the differences. However, for the remainder of this detailed description, the one-dimensional linear array representation 314" may be used.

The columns of representation 314 correspond to groups of instructions that have offsets of multiples of N plus a predetermined constant For example, one column in representation 314' comprises storage locations 202, 208, 214, 220, 226, 232 and 238. The corresponding grouping in representation 314" comprises the same instruction storage locations because they each have an offset (from the first storage location 200) of one plus an integer multiple of N. As previously noted, the examples herein use N=3, but other values are possible and contemplated. Thus, storage location 202 has an offset of one plus N times zero (equaling one). Storage location 208 is part of the same grouping and has an offset of one plus N times one (equaling four). Thus, the columns in representation 314' are merely "logical" columns. They do not represent the physical structure of instruction queue 314.

Representation 314" clearly illustrates how each storage location in instruction queue 314 (excluding the special storage locations at the beginning and end of the queue) has a "source" storage location and a "destination" storage location. For example, storage location 210's source is location 216 (as indicated by the arrows in the figure). Thus, if storage location 210 is empty, the instruction stored in storage location 216 may be shifted into location 210. Similarly, storage location 204 is the destination storage location of storage location 210. If location 204 is empty, then the contents of storage location 210 may be shifted into location 204 during compaction (e.g., if storage location 204 is part of a string of N empty storage locations).

Figure 11A:
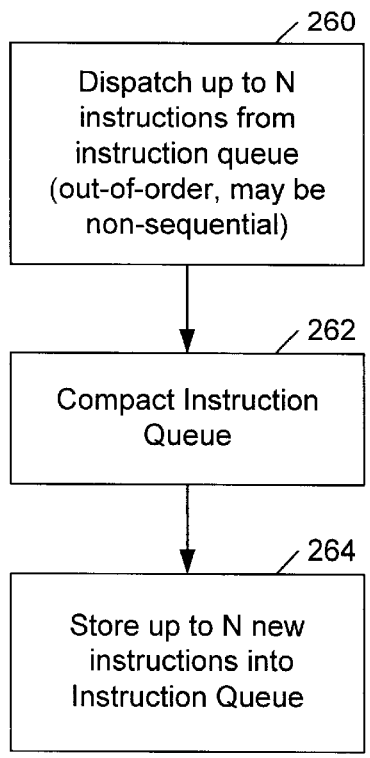
FIG. 11A is a flow chart depicting one embodiment of a method for managing an instruction queue.

Turning now to FIG. 11A, a flow chart depicting one embodiment of a method for managing an instruction queue is shown. Generally, the instruction queue is configured to dispatch up to N instructions (step 260) per clock cycle, wherein N is an integer greater than one. As previously. noted, the instructions dispatched may be out-of-order and may be non-sequential. In some embodiments, only one instruction may be issued per column (see e.g., FIG. 8D), while in other embodiments there are no limitations as to which storage locations may output instructions during a particular clock cycle. As used herein, non-sequential refers to instructions that are stored in storage locations that are not logically adjacent to one another. An example of this may be seen in FIG. 10, where storage locations 210 and 212 are logically adjacent (i.e., neighboring, with storage location 210 immediately preceding storage location 212), but locations 216 and 222 are not. Thus, instructions OP5 and OP6 are sequential, whereas instruction OP8 and OP11 are classified as non-sequential.

After dispatching the instructions, the instruction queue may be configured to "compact out" or compress the gaps formed by empty storage locations (step 262). After compaction, the instruction queue may continue by receiving up to N new instructions (step 264) if there are enough empty. storage locations. Note, however, that while steps 260–264 are shown in series, they may be performed in a different order or in parallel in some embodiments.

Figure 11B:
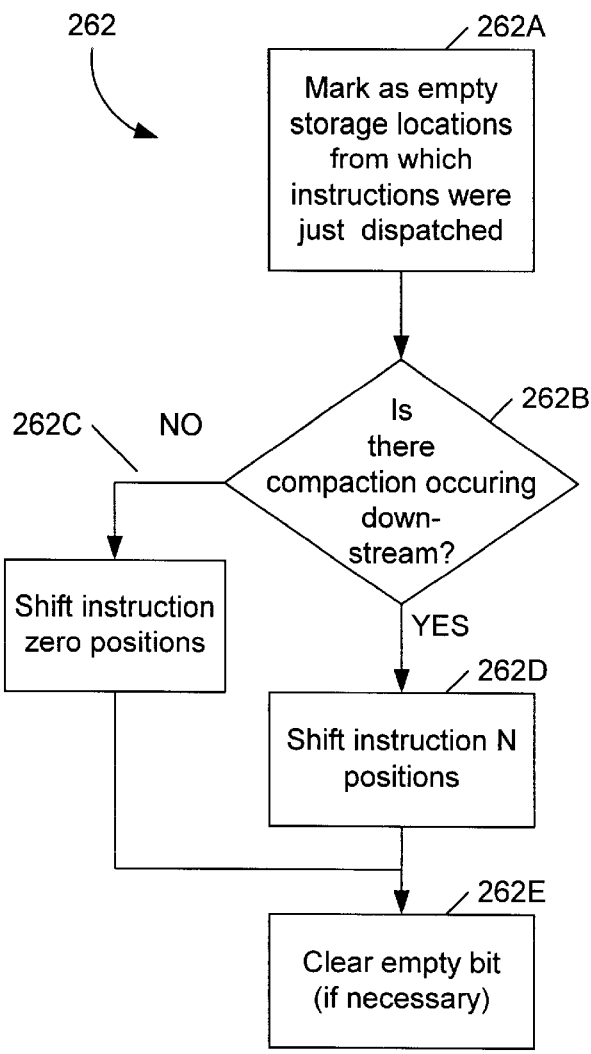
FIG. 11B is flowchart illustrating more details from the method of FIG. 11A.

Turning now to FIG. 11B, more details of one embodiment of a method for unaligned compaction are shown. In this embodiment, once one or more storage locations have been emptied by dispatching their instructions, then the instruction queue (or its control logic) may be configured to mark the storage location as empty by setting an empty bit (step 262A). During compaction, each multiplexer is configured to detect (either by itself or through corresponding control logic) whether any compaction takes place in its corresponding storage location or downstream in the queue (step 262B). Stated differently, if there are any strings of N empty storage locations in the queue between the storage location corresponding to the multiplexer and the end of the queue (i.e., "downstream"), then compaction will take place and the contents of the storage location corresponding to the multiplexer will be shifted N storage locations to the next multiplexer's corresponding storage location. As used herein, a multiplexer's "corresponding" storage location is the storage location coupled to receive and store data from the multiplexer's output. Referring briefly back to FIG. 8A, instruction storage location 200 is the corresponding storage location for multiplexer 250. Similarly, instruction storage location 202 is the corresponding storage location for multiplexer 252.

If compaction occurs at a multiplexer's corresponding storage location or downstream, then the contents of the corresponding storage location are shifted (step 262D). This occurs because the multiplexer will select the contents of a previous storage location (e.g., the storage location N positions upstream from the multiplexer's corresponding storage location) to be stored into the corresponding storage location. Conversely, if no compaction takes place, then the instruction stored in the destination storage location is shifted zero positions (step 262B and 262C). This occurs because the multiplexer will select the original contents to be stored back into the corresponding storage location. As previously discussed, the original contents may have been modified (e.g., by new value logic unit 292 in FIG. 9D). During or after shifting, the corresponding storage location's empty bit may be cleared if an instruction is written thereto (step 262E).

In addition to compaction, the instruction queue (or its associated control logic) may be configured to perform two additional tasks. First, the instruction queue may be configured to select the oldest eligible entry in order to determine which instruction or instructions to output during a particular clock cycle. Second, the instruction queue may also be configured to count the number of strings of empty storage locations and compare that value with the number of instructions that are to be stored in the instruction queue. These two tasks may each be optimized in a number of ways and are each described in detail below.

Oldest Eligible Entry

Figure 12A:
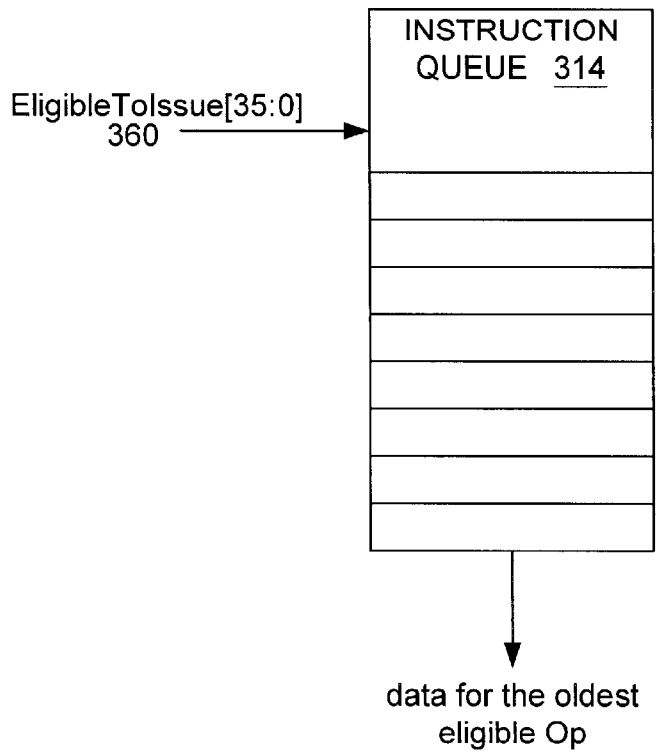
FIGS. 12A–B illustrate more details of two embodiments of an instruction queue.

As previously noted, locating and reading out the oldest eligible entry within instruction queue 314 is a time consuming task. This is particularly the case when instruction queue 314 is large. Turning now to FIG. 12A, one embodiment of instruction queue 314 configured to output the oldest eligible entry is shown. In this embodiment, instruction queue 314 is configured to receive thirty-six signal lines (collectively 360), each corresponding to a particular instruction stored within instruction queue 314. Each signal line is indicative of whether the corresponding instruction is eligible for issue. Depending upon the exact implementation of the microprocessor or floating point unit utilizing the instruction queue, an instruction may be eligible for issue when it is ready for execution or when it is ready to be conveyed to one of functional pipelines (see e.g., pipelines 320, 322, and 326 in FIG. 5). For example, in some embodiments instructions may be dispatched or issued to one of the functional pipelines even though the instruction is not yet ready for execution. In these embodiments, the functional pipelines may each have a reservation station (e.g., reservation stations 22A–C in FIG. 4) configured to store the instructions until they are executed. Instructions dispatched in this manner from instruction queue 314 to the functional pipelines' reservation stations may be waiting for operands values that are currently being calculated. Such embodiments may implement result-forwarding to speed the process of delivering the results to the instructions waiting in the reservation stations.

While the examples in this section illustrate finding a single oldest eligible entry, this is merely for simplicity and in actual practice a predetermined number of the oldest eligible entries may be found each clock cycle. For example, instruction queue 314 may be configured to output up to three of the oldest eligible instructions per clock cycle. The types of instructions output may be governed by the number and types of functional pipelines available. For example, assuming the configuration illustrated in FIG. 5, instruction queue 314 may be configured to output the oldest add instruction that is eligible for issue, the oldest multiply instruction that is eligible to issue, and the oldest store instruction that is eligible to issue. These three instructions may be output in a single clock cycle, or three load instructions may be output in a single clock cycle.

Oldest Eligible Entry—Serial Method

Figure 12B:
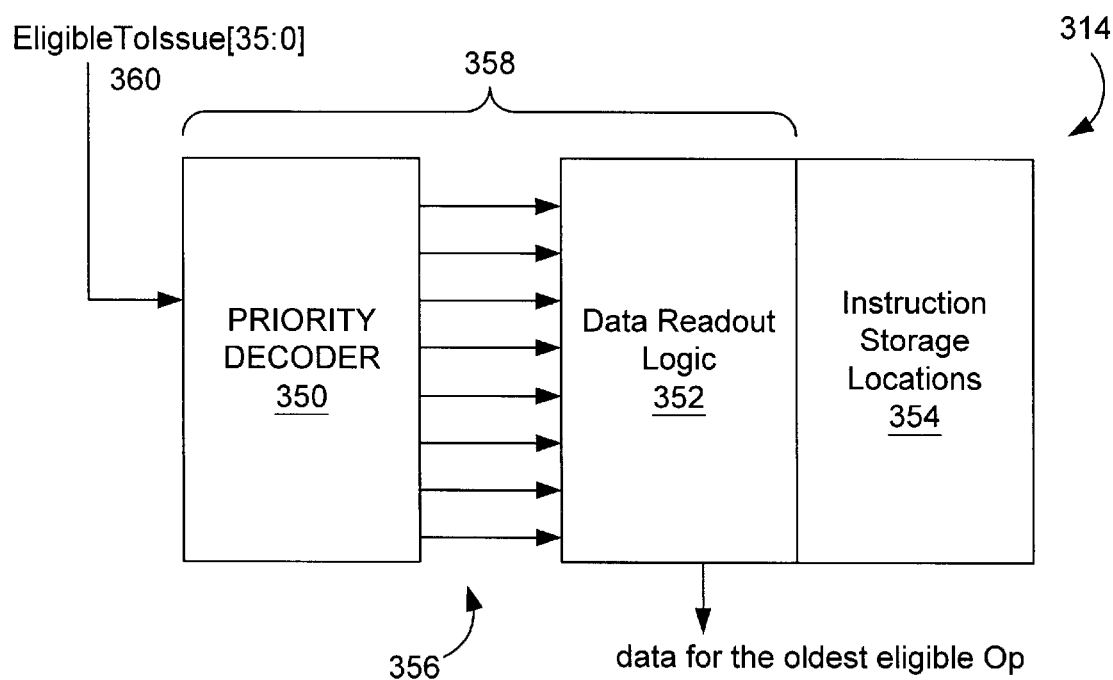

Turning now to FIG. 12B, more details of one embodiment of instruction queue 314 are shown. As the figure illustrates, in this embodiment instruction queue 314 comprises priority decoder logic 350, data read-out logic 352, and instruction storage locations 354. Priority decoder 350 and data read out logic 252 are each part of the instruction queue's control logic 358. Priority decoder 350 is configured to receive control signals 360 and sort them according to their priority (e.g., according to the relative age of their corresponding instruction). Each control signal corresponds to a particular instruction stored in instruction storage locations 354. Priority decoder 350 generates and outputs control signals 356 to data read-out logic 352. Control signals 356 may be conveyed in a "one hot" manner, wherein only the control signal corresponding to the oldest instruction stored in instruction storage locations 354 is asserted. Data read-out logic 352 is then configured to access the instruction storage location that corresponds to the asserted control signal and output the corresponding instruction.

There are, however, a number of potential drawbacks to this embodiment of control logic 358. One such potential draw back is the serialization of the selection and data read-out processes. This serialization may introduce additional delay or undesirable latency into instruction queue accesses. Another potential drawback involves the implementation of data readout logic 352. Data readout logic 352 may be implemented using tri-state buses. Tri-state buses may be undesirable for a number of reasons. First, they raise concerns about bus contentions (either transient or steady-state). They also raise concerns about neighbor-to-neighbor coupling with undriven nodes. Furthermore, many circuit design tools (e.g. timing and verification tools) have trouble analyzing circuits with tri-state buses.

Oldest Eligible Entry—Parallel Method

Figure 13:
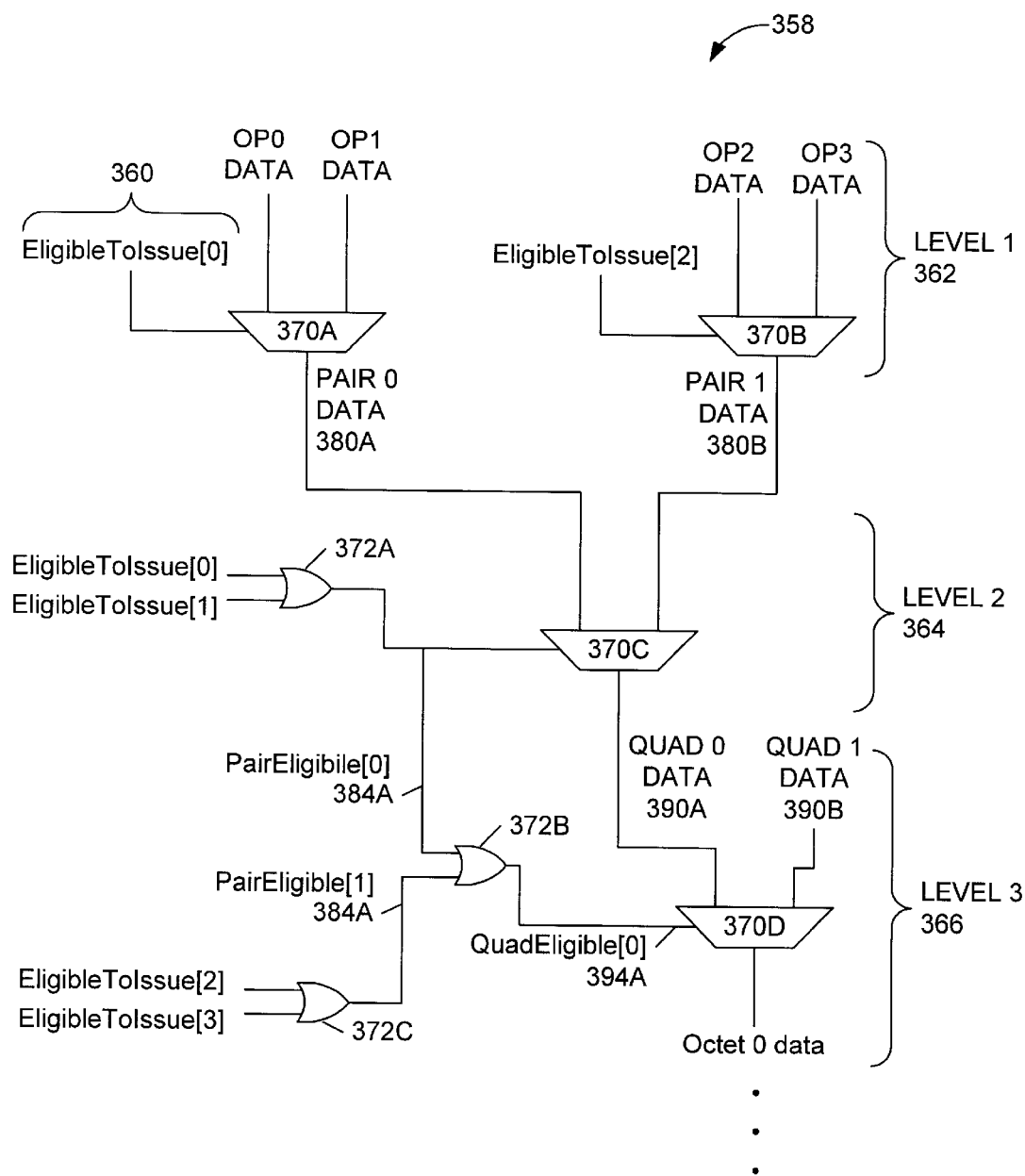
FIG. 13 illustrates one embodiment of the instruction queue control logic.

Turning now to FIG. 13, another embodiment of instruction queue 314's control logic 358 is shown. As the figure illustrates, this embodiment of control logic 358 comprises a plurality of multiplexers 370A–D and a plurality of OR gates 372A–C. Advantageously, this embodiment performs the prioritization calculation and data readout tasks in parallel to save time.

As in the previous embodiment, control signals 360 each correspond to a particular instruction stored in instruction queue 314. Control signals 360 are indicative of whether the corresponding instruction is ready to be dispatched to a functional unit. As the figure illustrates, control logic 358 may be conceptually divided into a plurality of logical levels 362–366. Each logical level in configured to select a fraction of the instructions provided to it by the previous level. In the embodiment shown, the first level is level one 362, which comprises multiplexers 370A and 370B. Multiplexer 370A is configured to receive instruction OP0 and instruction OP1. Multiplexer 370A is then configured to select either instruction OP0 or instruction OP1 based upon the control signal EligibleToIssue[0]. If EligibleToIssue[0] is asserted, then multiplexer 370A is configured to select instruction OP0 and convey it to an input of multiplexer 370C in logical level two 364. If however, EligibleToIssue[0] is not asserted, then instruction OP1 is selected. Similarly, multiplexer 370B is controlled by EligibleToIssue[2]. Multiplexer 370B is configured to receive and select one of instructions OP2 and OP3. The instruction selected by multiplexer 370A is referred to as pair zero data 380A. Similarly, the instruction selected by multiplexer 370B is referred to as pair one data 380B. Thus, level one 362 is configured to select half of the instructions stored in instruction queue 314 and convey these to level two 364. However, in other embodiments level one 362 may be configured to select other fractions of the instructions stored in instruction queue 314 (e.g., a fourth or two-thirds).

Level two 364 comprises multiplexer 370C and OR gate 372A. Level two 364 is configured to select one half of the instructions conveyed to it (i.e., one fourth of the instructions stored in instruction storage locations 354). OR gate 372A is configured to receive EligibleToIssue[0] and EligibleToIssue[1]. OR gate 372A is configured to logically OR these two control signals to generate the control signal PairEligible[0] 384A. PairEligible[0] 384A indicates whether either instruction OP0 or OP1 is eligible to be issued. Multiplexer 370C is controlled by PairEligible[0] 384A and thus selects either pair zero data 380A or pair one data 380B.

This process continues in logical level three 366. Multiplexer 370D is configured to select either quad zero data 390A or quad one data 390B. OR gate 372C is configured to generate control signal PairEligible[1] 384B, which is then conveyed to OR gate 372B along with PairEligible[0] 384A. OR gate 372B generates control signal QuadEligible[0] 394A, which in turn controls multiplexer 370D. As with the previous levels, logical level three 366 selects half of the instructions conveyed to it by level two (i.e., ⅛ of the instructions stored in instruction storage location 354).

This process may continue for a number of levels until a final eligible to issue instruction is selected. While level one 362 is portrayed as receiving only four instructions, in actual implementations level one 362 may receive all instructions stored in instruction storage locations 354 (e.g., 12 or 36 instruction). For example, level one 362 may comprise eighteen dual-input multiplexers. In another embodiment level one 362 may comprise a plurality of four-input multiplexers. Other logic devices may also be used to implement control logic 358, e.g., a ROM. Similarly, while three logical levels of control logic 358 are shown, more or less logical levels may be used.

This embodiment may have a number of potential advantages over the previously described serial embodiment. First, determining the oldest eligible entry and reading the oldest eligible entry are performed in parallel. This may potentially reduce the latency in the instruction queue read process. As the figure illustrates, at each level of control logic 358 there is one additional gate delay on the select line controlling the multiplexer. For example, in level one 362 EligibleToIssue [0] has zero gates to propagate through before reaching multiplexer 370A. Similarly, EligibleToLssue[2] has zero gates to propagate through before reaching multiplexer 370B. In level two 364, EligibleToIssue[0] and EligibleToIssue[0] propagate through one gate (i.e., OR gate 372A) before reaching multiplexer 370C. In level two 364, EligibleToIssue[0] and EligibleToIssue[1] propagate through one gate (i.e., OR gate 372A) before reaching multiplexer 370C. This extra gate delay at each level tends to create roughly equal data and control paths, thereby allowing them to operate in parallel.

Another potential advantage of this embodiment may be the absence of tri-state or precharge/pull down buses. While other embodiments may utilize shared buses for prioritization and or selection, this embodiment does not require their use. As previously noted, this reduces design concerns about transient and steady state contention, neighbor-to-neighbor coupling, and other issues.

Figure 14:
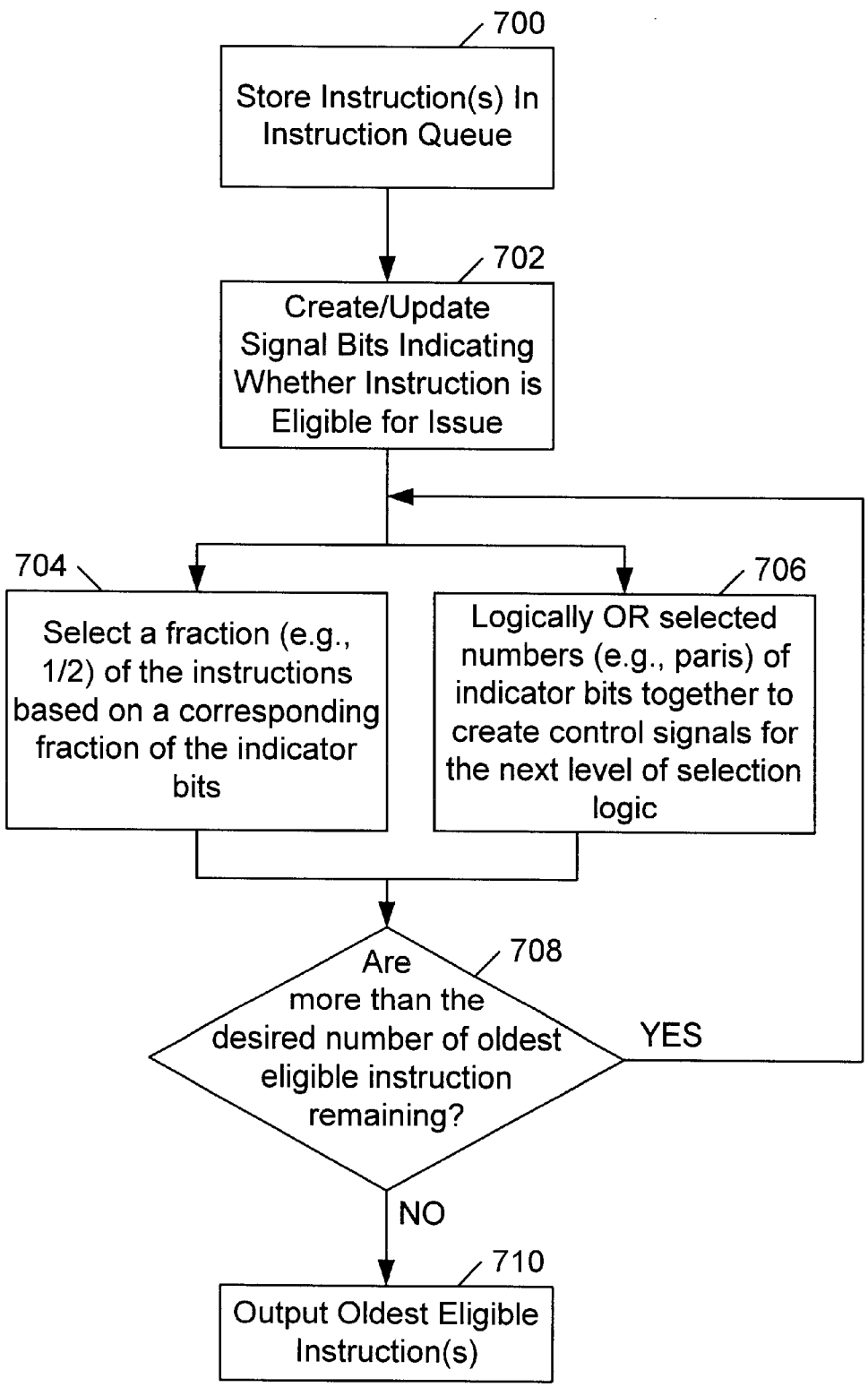
FIG. 14 is a flowchart of one embodiment of a method for selecting the oldest available entry in an instruction queue.

Turning now to FIG. 14, a flowchart of a parallel method for selecting the oldest available entry in the instruction queue is shown. As previously described, instructions are stored in instruction queue 314 (step 700). When the instructions are to be read out of the queue, a corresponding control signal indicating whether or not the instruction is eligible for issue is created (step 702). The control signal may be read from an indicator or signal bit stored with each instruction in the queue. This signal bit may be updated as need (e.g., when an operand becomes available).

Next, to determine which instructions should be issued, a fraction of the instructions are selected based on a corresponding fraction of the indicator bits (step 704). As in the previous example, one half of the control signals may be used to select half of the instructions. In parallel with the selection process (step 704), pre-selected pairs of indicator bits are logically ORed together to create control signals for the next level of selection logic (step 706). As the figure illustrates, steps 404 and 406 may be performed in parallel to reduce latency. Steps 704 and 706 may be repeated a number of times until the desired number of oldest eligible instructions is remaining (step 708). Once the desired number of oldest eligible instructions are remaining, they may be output to function units 320–326 (step 710).

The process described above may be performed a number of times in parallel. For example, three separate selection processes may be run, one to select the oldest addition instruction, one to select the oldest multiplication instruction, and one to select the oldest store instruction.

While any type of instruction may be stored in any column, and while any functional unit may receive instructions from any column, some embodiments may be implemented in a more limited fashion. In these embodiments the instructions may be stored in columns according to which functional pipeline they will be issued to. In such an embodiment, the selection process may be performed three times in parallel, i.e., once for each column. Other embodiments are also possible and contemplated.

In some embodiments, instruction queue 314 may be configured to output more than one instruction per clock cycle. For example, instruction queue 314 and control logic 358 may be configured to output the three oldest eligible-to-issue instructions during clock cycle (if the corresponding functional pipelines are available). Further note that an instruction's relative age may be determined by its storage position within instruction queue 314 or by a counter associated with the instruction and stored within instruction queue 314.

Detection of a "Full" State

As previously noted, simply increasing the size of the instruction queue to reduce functional pipeline stalls has certain limitations. For example, the larger the instruction queue, the slower and more complex the instruction queue's control logic becomes. Similarly, the larger the instruction queue, the more die space is consumed by the control logic. In one embodiment, the instruction queue may be configured to address these concerns by maximizing storage location usage. This may reduce the overall size of the instruction queue and increase its speed without raising functional pipeline stall rates.

In one embodiment, instruction queue 314 may be configured to indicate to other parts of the microprocessor how many empty storage locations are currently available. For example, the microprocessor's alignment and or decode logic (e.g., alignment unit 18 and early decode unit 44 in FIG. 4) may be configured to communicate with instruction queue 314 each time an instruction destined for FPU 36 is about to be dispatched. Since more than one instruction may be dispatched per clock cycle, the alignment and decoding logic may convey a signal indicative of the number of instructions that are about to be dispatched to instruction queue 314. In response, instruction queue 314 may examine its storage locations to determine how many storage locations are empty (i.e., how many instruction storage locations it may receive). Instruction queue 314 may then compare the number of available storage locations with the number of instructions to be dispatched. If there are not enough empty storage locations, instruction queue 314 may signal a "full" condition to the alignment/decode logic. This will cause the alignment/decode logic to stall (or at least cease processing any additional floating point instructions) until the instruction queue has emptied additional storage locations.

In some embodiments, the alignment/decode logic may convey an indication of the number of strings of N instructions to be dispatched to instruction queue 314. For example, in some embodiments instruction queue 314 may be line-oriented. In such embodiments, instruction queue 314 is configured to allocate an entire row of storage locations each clock cycle in which instructions are received. This applies even if fewer instructions are received than the number of storage locations in a row. For example, instruction queue 314 may have three instruction storage locations per row (i.e., N=3). Assuming instruction queue 314 receives only two instructions in a particular clock cycle, instruction queue 314 may nonetheless allocate an entire line to three instructions. While this may potentially increase the number of gaps or empty storage locations within instruction queue 314, it may also improve the speed at which instruction queue 314 is able to operate.

In summary, instruction queue 314 may be configured to receive indications from other parts of microprocessor 10 indicating how many strings of N instructions will be dispatched to instruction queue 314 in the next few clock cycles. Instruction queue 314 may then compare this number with the number of available strings of storage locations. Thus, instruction queue 314 may be configured to indicate to the remainder of microprocessor 10 whether or not instruction queue 314 is full.

Pipelining within the microprocessor and floating point unit may further complication this process. For example, if there are a number of pipeline stages between alignment/decode of an instruction and the storage of the instruction in instruction queue 314, then instruction queue may improperly calculate the number of available storage locations (i.e., by counting storage locations that are currently empty but that have been essentially already been allocated to instructions that are on their way to instruction queue 314 but that have not yet arrived). These instructions which have been dispatched (i.e., sent out) by the alignment/decode logic but have not yet arrived at the instruction queue are called "in-flight" instructions. This problem may be addressed by maintaining a number of empty entries equal to maximum number of instructions in-flight from earlier pipeline stages. Once again, however, this may unnecessarily increase the size of instruction queue 314 and control logic 358.

In one embodiment, however, instead of simply allocating a number of storage locations equal to the maximum number of instruction, instruction queue 314 and control logic 358 may instead be configured to receive a more accurate indication of the number of instructions in-flight from the pipeline stages between early decode unit 44 and instruction queue 314. This enables instruction queue 314 to maintain only as many empty entries as are actually needed based upon information from the various pipeline stages in microprocessor 10 and instruction alignment unit 18. Advantageously, this may allow greater utilization of the instruction storage locations in instruction queue 314, thereby potentially reducing stalls and improving performance. This may also, however, result in less time for the instruction queue's control logic to perform the calculations for determining whether the instruction queue is full.

In order to quickly calculate the number of empty strings the instruction queue's control logic may be configured to rapidly count the number of empty strings in the instruction queue. While this may be a simple task when the instruction queue is counting aligned strings, counting empty strings in embodiments of the instruction queue that are configured to perform unaligned compaction is more complicated, as described below.

Over-counting

Figure 15:
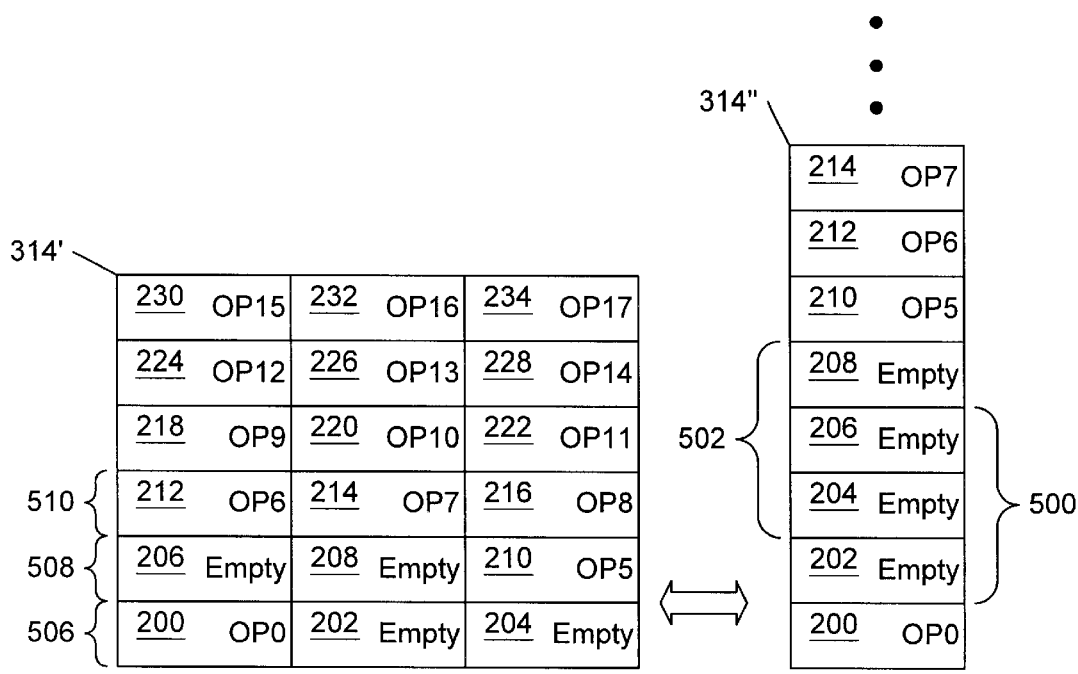
FIG. 15 illustrates the potential hazard of over-counting.

Turning now to FIG. 15, one embodiment of instruction queue 314 configured to count unaligned strings is shown. This figure illustrates one potential difficulty related to line-oriented instruction queues. An accurate count of all strings of N contiguous empty storage locations is normally desired. Assuming unaligned compaction is implemented, however, the starting location of each string may vary (i.e., the strings need not be aligned). Thus, the starting location of the string is not determinative of whether the string is counted.

This complicates the counting process because the individual strings have a tendency to be counted twice if they overlap. This is referred to as "over-counting" and is illustrated in the figure. Assuming that N (i.e., the constant indicative of the minimum string length and row length) is three, empty storage locations 202–206 would comprise one string. Similarly, empty storage locations 204–208 would also comprise a string. However, both of these strings overlap. Thus, counting them both may lead to an inaccurate count of the available strings (i.e., empty storage locations 204 and 206 would effectively be counted twice). Thus, overlapping strings tend to undermine the straight forward approach of first counting the number of strings in one group of storage locations, shifting the group being examined, counting again, and then summing the results. If this straight-forward approach were followed, the instruction queue would indicate two empty strings (strings 500 and 504) were present even though only four empty storage locations (202–208) actually exist.

Under–counting

Figure 16:
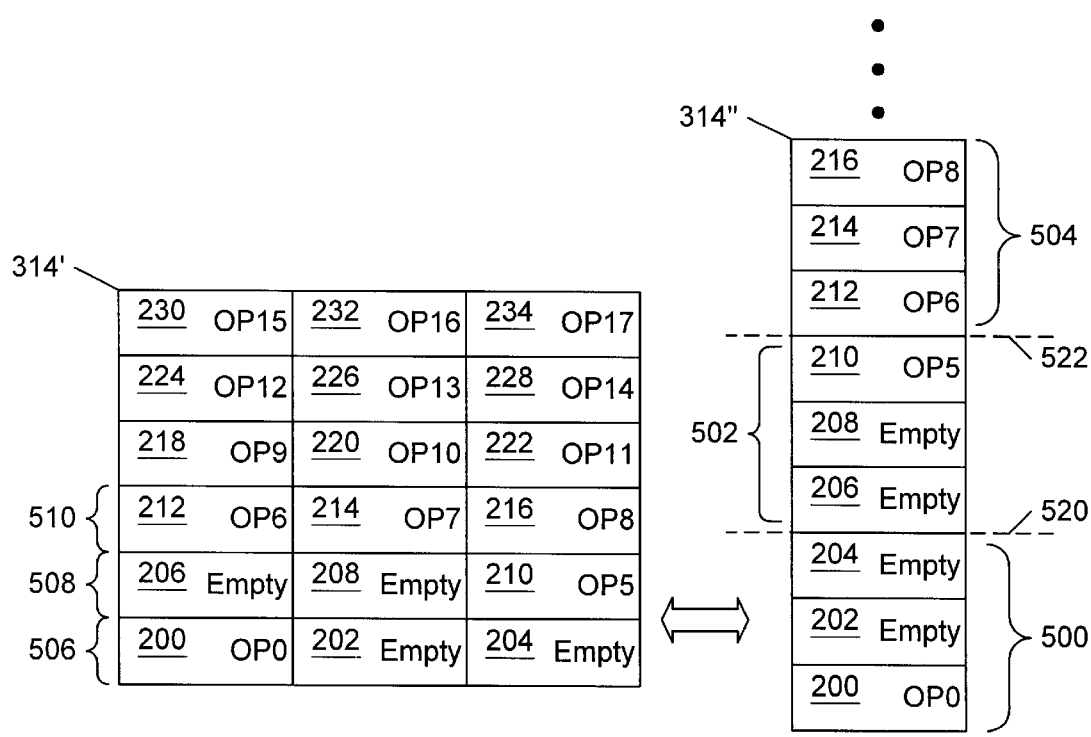
FIG. 16 illustrates the potential hazard of under-counting.

Turning now to FIG. 16, another example of instruction queue 314 is shown to illustrate the potential hazard of under-counting. In this example, instruction storage locations are grouped by row and empty strings are counted. However, as the figure illustrates, the four empty contiguous instruction storage locations 202–208 are not counted because they cross instruction storage location group boundaries 520 and 522 (i.e., they cross row boundaries) and do not form an aligned empty string.

Counting Portion of Control Logic

Figure 17:
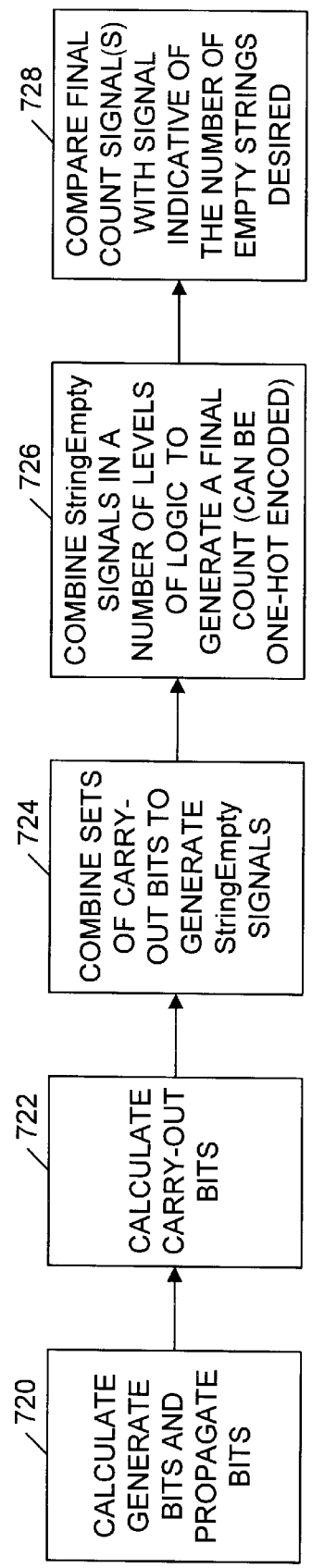
FIG. 17 is a flowchart depicting one embodiment of a method to rapidly determine the number of unaligned empty strings in an instruction queue.

Turning now to FIG. 17, one embodiment of a method to rapidly determine the number of unaligned empty strings in an instruction queue is shown. As the figure illustrates, a "generate" bit and a "propagate" bit are first generated for each instruction storage location in the instruction queue (step 720). These bits mimic the functionality of a look-ahead adder. The details of each step are described in greater detail below in connection with FIGS. 18–22. Next, the generate and propagate bits are used to calculate a "carry-out" bit for each instruction storage location in the instruction queue (step 722). The carry-out bits may be calculated in the same manner as with a look-ahead adder. Next, the carry-out bits are combined to generate a plurality of StringEmpty control signals (step 724). Each asserted StringEmpty signal represents a separate empty string within the instruction queue. The StringEmpty signals are then combined in a number of levels of logic (e.g., a tree of adders) to generate a final count representative of the total number of empty strings in the instruction queue (step 726). A variety of formats may be used for the final count value, e.g., one-hot encoding. The final count value is then compared with the-number of empty strings desired (e.g., the number of instruction strings to be conveyed to the instruction queue in the next few clock cycles. The instruction queue may receive input from the preceding pipeline stages and incorporate the number of in-flight strings into the number of desired strings to improve the utilization of the storage locations in the queue. FIGS. 18–22 each illustrate portions of one embodiment of counting logic 380 that implement the steps of the method just described.

Figure 18:
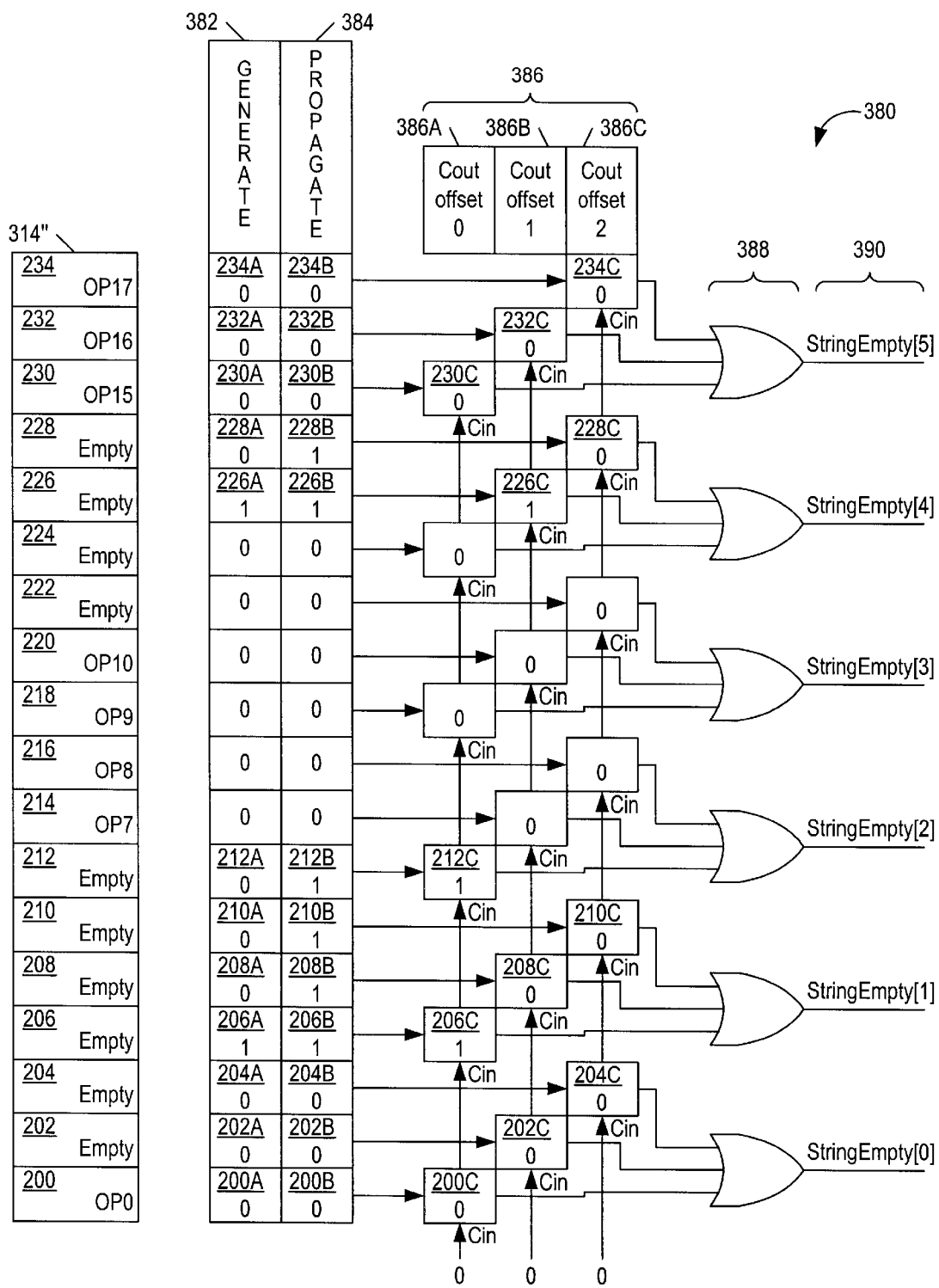
FIG. 18 illustrates one embodiment of counting logic.

Turning now to FIG. 18, a portion of one embodiment of counting logic 380 is shown (counting logic 380 is part of control logic 358). In this embodiment, counting logic 380 may comprise two logical units: a propagate/generate logic unit (represented by generate bits 382 and propagate bits 384) and a carry-out logic unit 386. Counting logic unit 380 is advantageously configured to count unaligned empty strings without over-counting or under-counting. Counting logic 380 is configured to count empty strings in three separate groups: (1) those staring at storage locations 200, 206, 212, 218, 224, and 230; (2) those starting at storage locations 202, 208, 214, 220, 226, and 230; and (3) those starting at storage locations 204, 210, 216, 222, 228. This configuration creates "alignment" by counting empty triples starting at different offsets separately. This detects strings of empty storage locations which are multiples of N in length (wherein N is three in the example) using logic adapted from adder design. In this embodiment, a pattern of FEEE (wherein F represents a full instruction storage location, and wherein E represents an empty storage location) is a "generate" pattern. Similarly, the pattern EEE is a "propagate" pattern. Each time one of these two patterns is detected, control logic 380 creates asserted generate bits 382 and propagate bits 384, respectively. One generate bit and one propagate bit is generated for each of the instruction storage locations in instruction queue 314. Generate bits 382 and propagate bits 384 are then divided into three groups and conveyed to "carry out" calculation logic 386, which in turn generates "carry out" bits for each storage location in instruction queue 314. The carry out bits are then combined (e.g., by logic such as OR gates 388) to form StringEmpty signals 390.

As the figure shows, the empty storage locations 202–206 which follow a full storage location 200 cause an asserted generate bit 206A. Similarly, empty storage locations 202–206 cause an asserted propagate bit 206B. Similarly, empty storage locations 204–208 cause asserted propagate bit 208B. However, generate bit 208A is not asserted because the empty string of instruction storage locations 204–208 do not immediately follow a full instruction storage location (i.e., a FEEE pattern is not present, only EEE). Each. set of generate and propagate bits is then conveyed to carry-out calculation logic 386, which calculates and outputs a corresponding carry-out bit for each storage location in the queue. The carry-out bits are indicative of non-overlapping strings of empty instruction storage locations.

Carry-out logic 386 may be configured to generate carry-out bits according to the following formula: $C_1 = G_0 + C_0 \times P_0$. In this equation, $C_1$ represents the carry-out bit, $G_0$ represents the generate bit, $C_0$ represents the carry-out bit corresponding to the previous instruction storage location, and $P_0$ represents the propagate bit. This formula may be applied to generate bits 382 and propagate bits 384 to calculate the corresponding carry-out bits. For example, in order to determine whether carry-out bit 206C is asserted, carry-out logic 386 is configured to assert carry-out bit 206C if generate bit 206A is asserted (which it is) or if carry-out bit 200C and propagate bit 206B are asserted. Similarly, carry-out bit 212C is asserted because propagate bit 212B is asserted and carry-out bit 206C is asserted (i.e., carry-out bit 206C functions as carry-in bit $C_0$ in the formula). Thus, while propagate bit 208B is asserted, carry-out bit 208C is not asserted because neither generate bit 208A nor carry-out bit 202C are asserted.

While the numerous examples described herein and in the accompanying figures use groupings of three instructions (i.e., N=3), other configurations are possible and contemplated. For example, a pattern of FEEEE may be used to create a generate bit and a pattern of EEEE may be used to generate a propagate bit. In such a configuration, combination logic 388 may comprise four input OR-gates in lieu of three input OR-gates. In another embodiment, the pattern FEE may be used to create generate bits 382, and the pattern EE may be used to create propagate bits 384. Similarly, the groupings used to generate carry-out bits (e.g., group 386A, 386B, and 386C) may also be modified. For example, four sets of carry-out bits each having a different offset (e.g., zero through three) may be used. Simple OR gates 388 are useable because the carry out signals generated and conveyed to a each individual OR gate by the generate bits 382 and propagate bits 384 are mutually exclusive (i.e., each OR gate will receive at most one asserted carry out signal).

Figure 19:
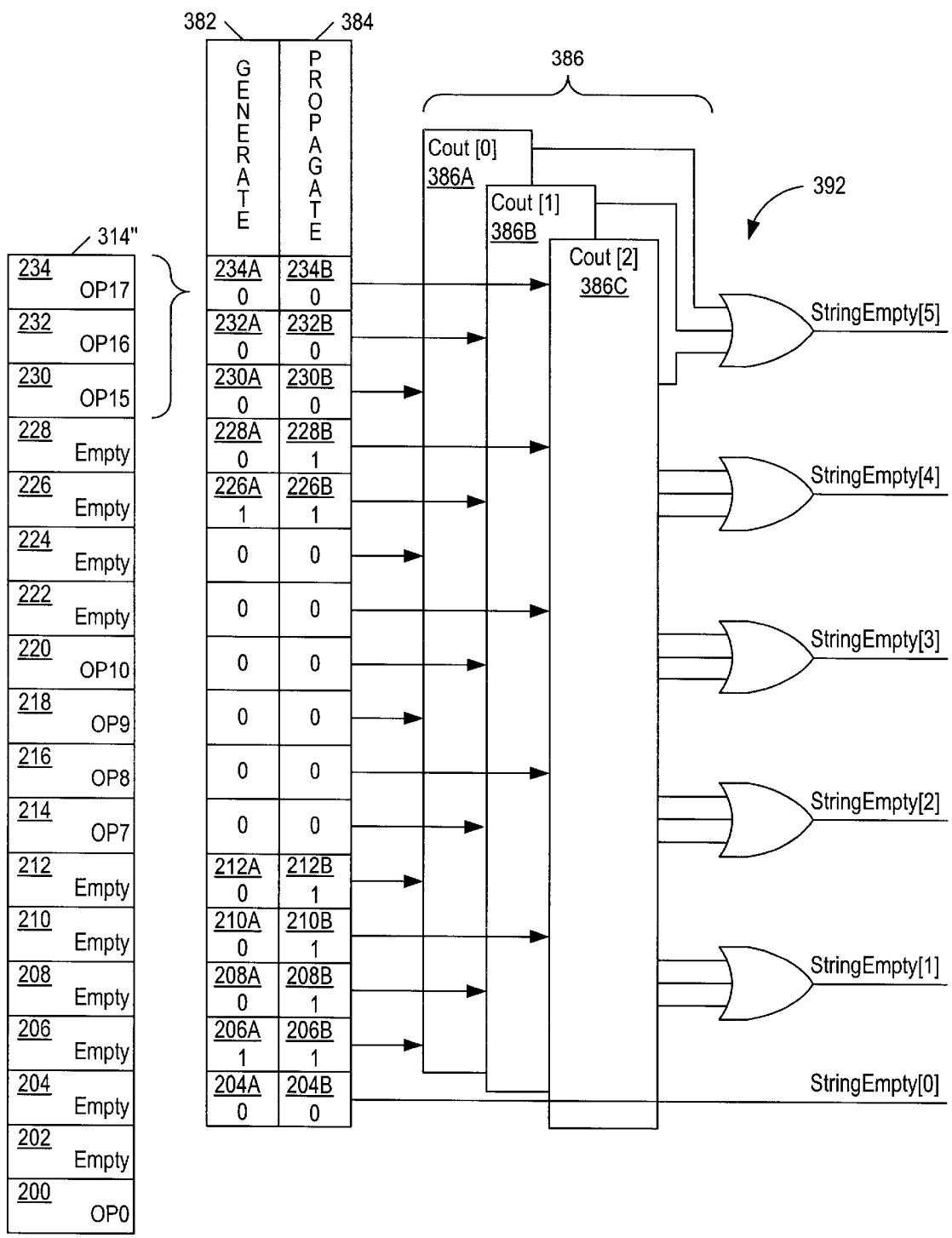
FIG. 19 illustrates another embodiment of counting logic.

Turning now to FIG. 19, another embodiment of counting logic 380 is shown In this embodiment, carry-out logic 386 is divided into three parallel calculation units. As the figure illustrates, counting logic 380 may be configured to calculate generate bits 382, propagate bits 384, and carry-out bits 392 in parallel. For example, generate bits for instruction storage locations 234–204 are calculated in parallel. Similarly, propagate bits 384 may be calculated in parallel with generate bits 382. The carry-out bits for groups 386A, 386B, and 386C, may also be calculated in parallel with each other. Advantageously, this may reduce the time required to calculate the number of empty triples in instruction queue 314. Generate and propagate bits corresponding to instruction storage locations 200, 202, and (in some cases) 204, may be hardwired in lieu of actually calculating them. This is because there are no instruction storage locations preceding storage location 200.

Figure 20:
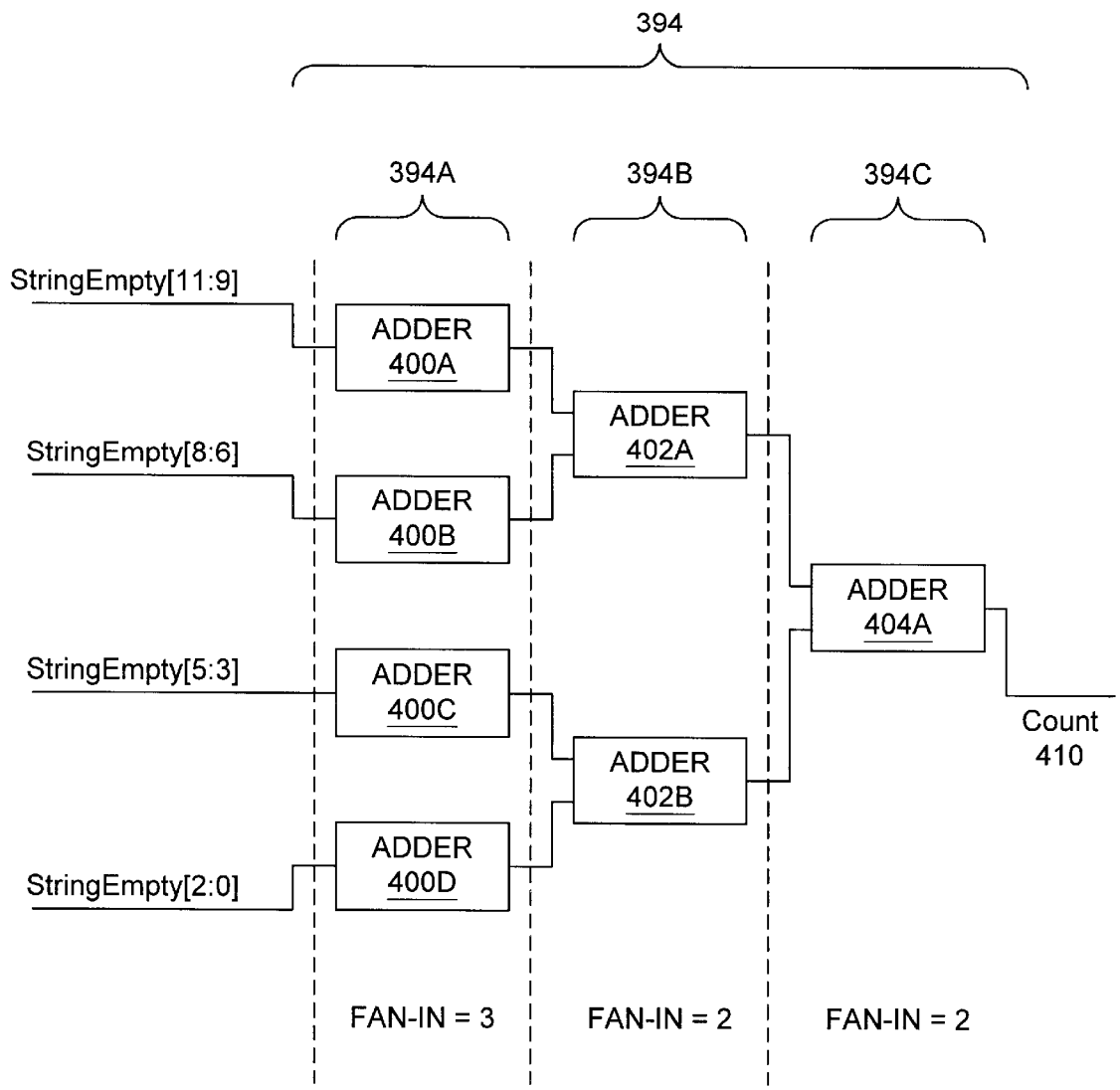
FIG. 20 illustrates one embodiment of combination logic.

Turning now to FIG. 20, one embodiment of combination logic 394 is shown. Combination logic 394 is part of control logic 358 and may be coupled to receive StringEmpty control signals from counting logic 380. The example illustrated in the figure assumes an instruction queue having thirty-six instruction storage locations with counting logic 380 producing twelve StringEmpty signals (i.e., StringEmpty[11:]). Combination logic 394 may be divided into several levels (e.g., levels 394A, 394B, and 394C) to allow the combination process to be performed in parallel. For example, level 394A may comprise a plurality of adders 400A–400D each configured to receive three StringEmpty signals and sum them, thereby producing the output sent to adders 402A and 402B in the second level 394B. Adders 402A and 402B may in turn be configured to sum the values they receive and convey the results to adder 404a in the third level 394C.

Note, however, that other embodiments of combination logic 394 are also possible and contemplated. For example, in some embodiments different fan-in ratios may be used for the adders in levels 394A–394C. In one such configuration, adders in stage 394A may have a fan-in ratio of 3 to 1, meaning that each adder receives three signals to be added and outputs a single sum. Similarly, the adders in level 394B may each receive two inputs from level 394A and output one sum. Similarly, adder 404A in level 396C may receive two inputs (i.e., one from adder 402A and one from adder 402B) and output a single signal 410. The final count 410 output by level 394C is representative of the final count of empty strings in instruction queue 314.

In some embodiments, as illustrated in the figure, it may be desirable to configure the adders in the earlier stages (e.g. 394A and/or 394B) with higher fan-ins. Furthermore, since StringEmpty[0] may simply equal carry-out[2] (i.e., unlike the other StringEmpty signals which propagate through a three-input OR-gate), StringEmpty[0] may be read directly from carry-out calculation logic 386. Thus, StringEmpty[0] may be input into the disadvantaged inputs in adders 400D, 402B, and 404A. This may help to balance the propagation delays through stages 394A, 394B, and 394C.

Figure 21:
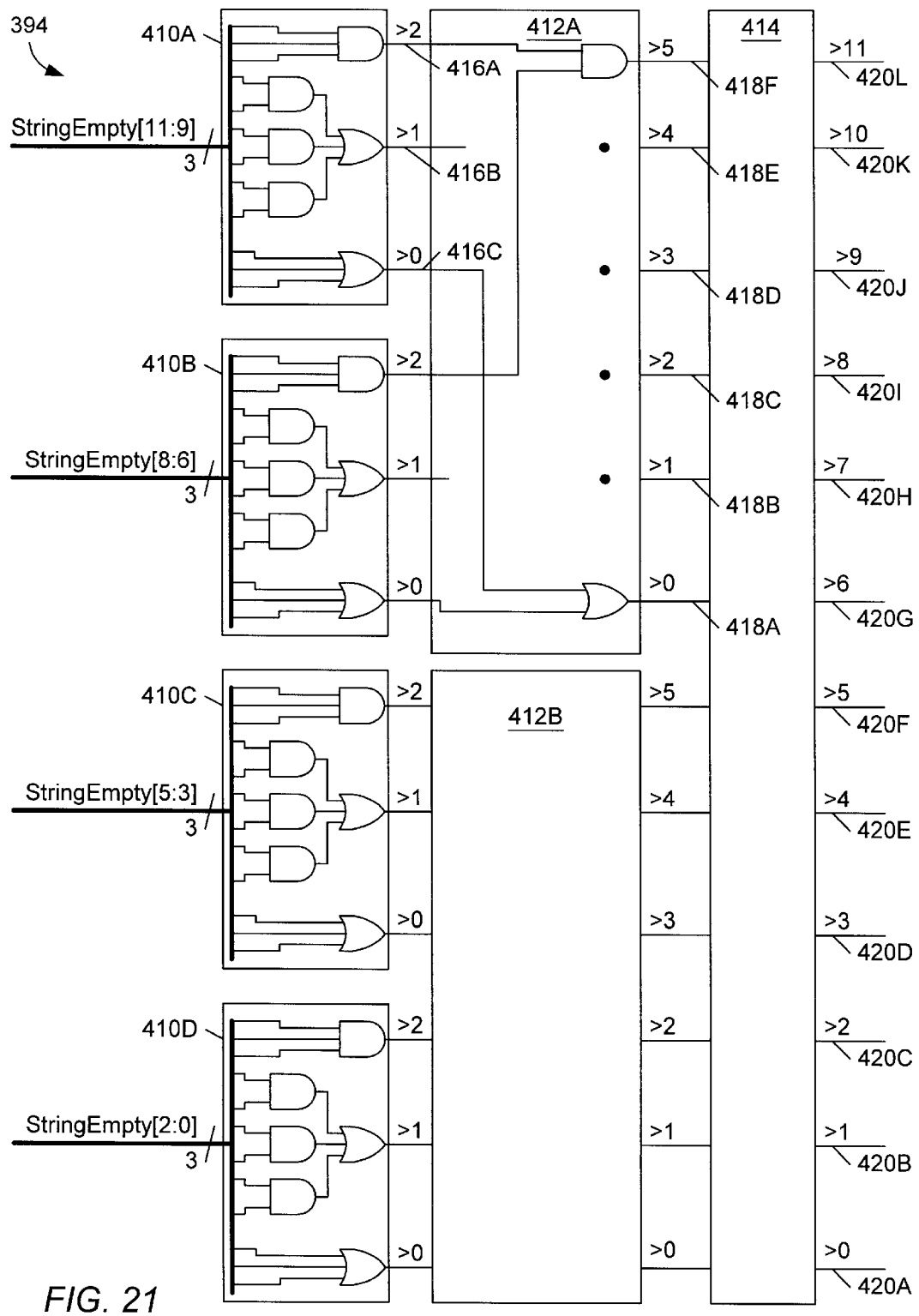
FIG. 21 illustrates another embodiment of combination logic.

Turning now to FIG. 21, another embodiment of combination logic 394 is shown. In this embodiment, however, combination logic 394 comprises a plurality of comparison circuits 410A–410D, 412A–412B, and 414 in lieu of adders 400A–404A. Advantageously, comparison circuits 410A–414 produce a decoded count 420 from StringEmpty [0:11]. The decoded count signals 420A–L are each indicative of whether more than a predetermined number of empty strings are present in instruction queue 314. For example, output 420A is asserted if one or more empty strings are present in instruction queue 314. Output 420B, however, is only asserted if two or more empty triples are present in instruction queue 314. Advantageously, the calculations for determining whether (A+B)>N is true may require less hardware and or time than computing the exact value of A+B.

In one embodiment, comparison circuit 410A comprises a plurality of logic gates (e.g., AND-gates-and OR-gates) configured to determine which of the following conditions, if any, are present in StringEmpty[11:9]: (a) one or more empty triples are present; (b) two or more empty triples are present; or (c) three or more empty triples are present For example, if any StringEmpty signal is asserted, then one or more empty strings are present in instruction queue 314. Thus, comparison circuit 410 is configured to assert output 416C based on the output of a three-input OR-gate. Similarly, if two or more signals of StringEmpty[11:9] are asserted, then comparison circuit 410A is configured to assert output 416B. If all three StringEmpty[11:9] signals are asserted, then outputs 416A–C are all asserted.

The outputs from comparison circuits 410A and 410B may then be fed into stage two comparison circuit 412A. Circuit 412A is then configured to combine the outputs from comparison circuits 410A and 410B to generate outputs 418A–418F. Similarly, final stage comparison circuit 414 is configured to receive the outputs from comparison circuits 412A and 412B and generate output signals 420A–420L. Thus, circuit 414 outputs a plurality of signals each indicative of whether a predetermined number (or greater) of empty strings is present in instruction queue 314.

While the final count 410 generated by the embodiment illustrated in FIG. 20 may be subtracted from the desired number of strings to detect a full condition, this type of subtraction operation may require an- additional adder and a significant amount of time to perform. Advantageously, the embodiment of FIG. 21 may use simple combinatorial logic in lieu of an adder.

Figure 22:
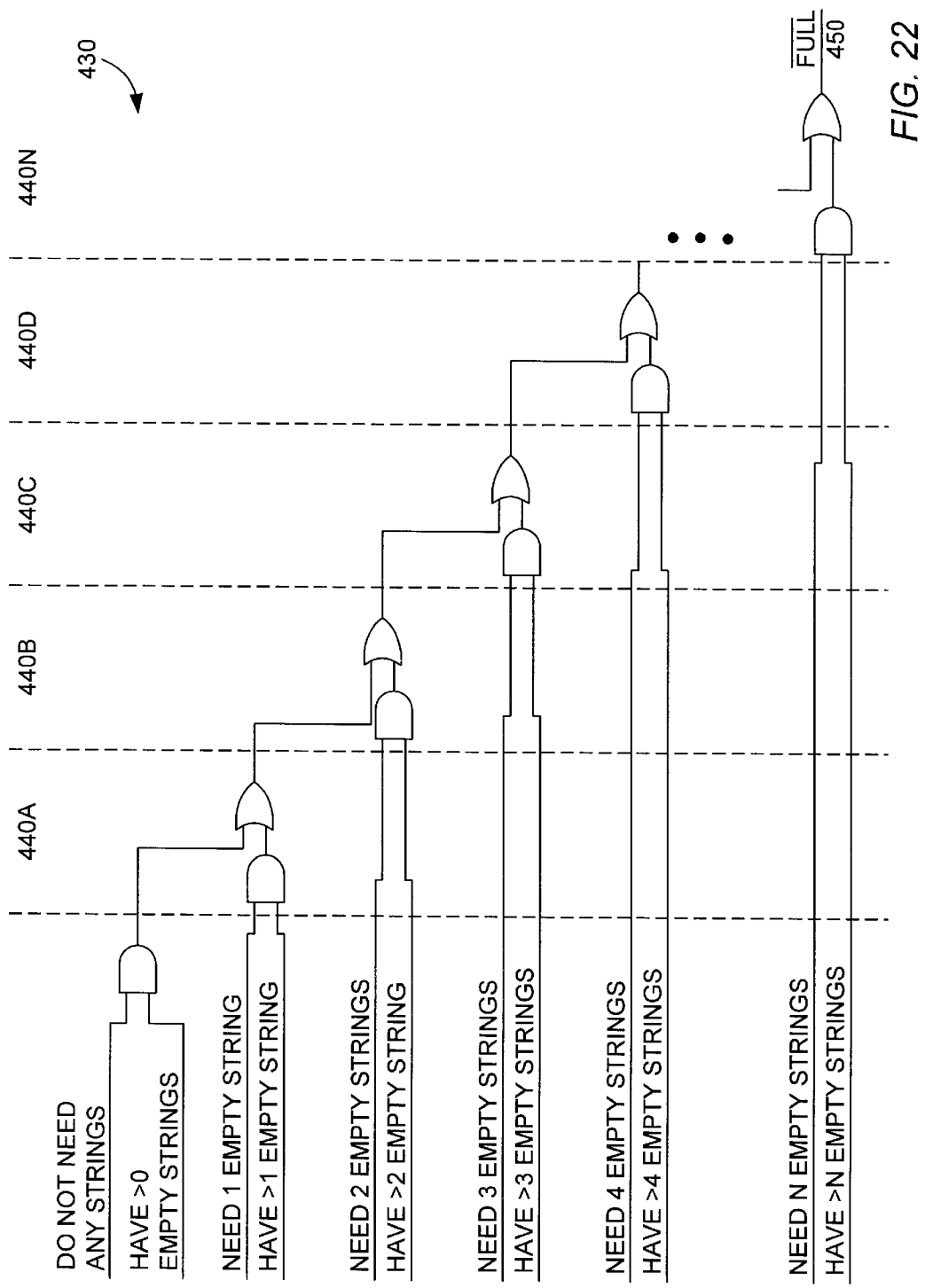
FIG. 22, one embodiment of this combinatorial logic 430 is shown.

Turning now to FIG. 22, one embodiment of this combinatorial logic 430 is shown. In this embodiment, the signal from instruction alignment unit 18 indicative of the number of instruction strings dispatched to the instruction queue is decoded into a "one-hot" format (see "NEED X EMPTY STRINGS" signals in the figure). These one-hot signals may be compared with the outputs of combination logic 394 using a plurality of AND-gates and OR-gates. This configuration may be used to determine output 450, which indicates whether instruction queue 314 will be full after accepting instructions that have already been sent to the instruction queue 314 from instruction cache 16.

In one embodiment, combinatorial logic 430 may be optimized by comparing the signals representative of the lowest number of empty strings before comparing the signals representative of higher numbers of empty strings. Since the lower-order signals may require less time to calculate, they may be compared first and propagated through combinatorial logic 430 until the signals indicative of higher numbers of empty strings are available (each stage of propagation delay is represented by one column in the figure, i.e., columns 440A–440N). This configuration may tend to even out the propagation delays present in control logic 358.

Computer System

Figure 23:
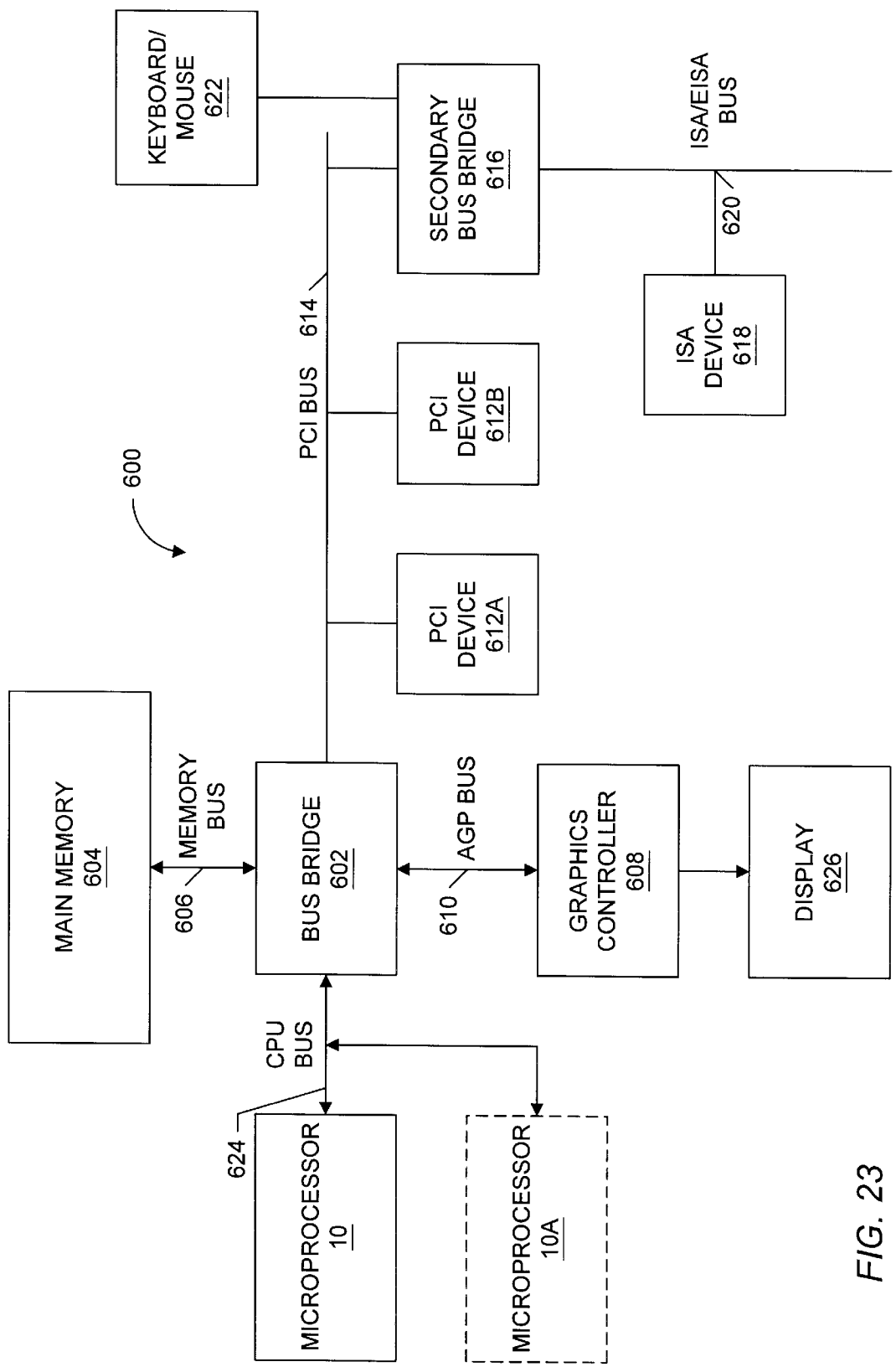
FIG. 23 is a block diagram of one embodiment of a representative computer system.

Turning now to FIG. 23, a block diagram of one embodiment of a representative computer system 600 including microprocessor 10 and instruction queue 314 is shown.

Microprocessor 10 is coupled to a variety of system components through a bus bridge 602, although other embodiments are possible and contemplated. In the depicted system, a main memory 604 is coupled to bus bridge 602 through a memory bus 606, and a graphics controller 608 is coupled to bus bridge 602 through an AGP bus 610. Finally, a plurality of PCI devices 612A–612B are coupled to bus bridge 602 through a PCI bus 614. A secondary bus bridge 616 may further be provided to accommodate an electrical interface to one or more EISA or ISA devices 618 through an EISA/ISA bus 620. Microprocessor 10 is coupled to bus bridge 602 through a CPU bus 624.

Bus bridge 602 provides an interface between microprocessor 10, main memory 604, graphics controller 608, and devices attached to PCI bus 614. When an operation is received from one of the devices connected to bus bridge 602, bus bridge 602 identifies the target of the operation (e.g. a particular device or, in the case of PCI bus 614, that the target is on PCI bus 614). Bus bridge 602 routes the operation to the targeted device. Bus bridge 602 generally translates an operation from the protocol used by the'source device or bus to the protocol used by the target device or bus.

In addition to providing an interface to an ISA/EISA bus for PCI bus 614, secondary bus bridge 616 may further incorporate additional functionality, as desired. For example, in one embodiment, secondary bus bridge 616 includes a master PCI arbiter (not shown) for arbitrating ownership of PCI bus 614. An input/output controller (not shown), either external from or integrated with secondary bus bridge 616, may also be included within computer system 600 to provide operational support for a keyboard and mouse 622 and for various serial and parallel ports, as desired. An external cache unit (not shown) may further be coupled to CPU bus 624 between microprocessor 10 and bus bridge 602 in other embodiments. Alternatively, the external cache may be coupled to bus bridge 602 and cache control logic for the external cache may be integrated into bus bridge 602.

Main memory 604 is a memory in which application programs are stored and from which microprocessor 10 primarily executes. A suitable main memory 604 comprises DRAM (Dynamic Random Access Memory), and preferably a plurality of banks of SDRAM (Synchronous DRAM).

PCI devices 612A–612B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 618 is illustrative of various types of peripheral devices, such as a modem, a sound card, and a variety of data acquisition cards such as GPIB or field bus interface cards.

Graphics controller 608 is provided to control the rendering of text and images on a display 626. Graphics controller 608 may embody a typical graphics accelerator generally known in the art to render three-dimensional data structures which can be effectively shifted into and from main memory 604. Graphics controller 608 may therefore be a master of AGP bus 610 in that it can request and receive access to a target interface within bus bridge 602 to thereby obtain access to main memory 604. A dedicated graphics bus accommodates rapid retrieval of data from main memory 604. For certain operations, graphics controller 608 may further be configured to generate PCI protocol transactions on AGP bus 610. The AGP interface of bus bridge 602 may thus include functionality to support both AGP protocol transactions as well as PCI protocol target and initiator transactions. Display 626 is any electronic display upon which an image or text can be presented. A suitable display 626 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 600 may be a multiprocessing computer system including additional microprocessors (e.g. microprocessor 10a shown as an optional component of computer system 600). Microprocessor 10a may be similar to microprocessor 10. More particularly, microprocessor 10a may be an identical copy of microprocessor 10. Microprocessor 10a may share CPU bus 624 with microprocessor 10 (as shown in FIG. 5) or may be connected to bus bridge 602 via an independent bus.

It is still further noted that the present discussion may refer to the assertion of various signals. As used herein, a signal is "asserted" if it conveys a value indicative of a particular condition. Conversely, a signal is "deasserted" or "not asserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Numerous variations and modifications will become apparent to those skilled in the art once the above disclosure is fully appreciated. It is intended that the following claims be interpreted to embrace all such variations and modifications. For example, while details of a number of different embodiments have been disclosed, the invention is not limited to those embodiments disclosed herein.

What is claimed is:

1. A method for operating a queue, the method comprising:

estimating the number of entries that are currently in-flight;

counting the number of non-overlapping groups of N consecutive empty storage locations in the queue, wherein said number of groups includes groups which are separated by non-empty storage locations, and wherein N is a positive integer greater than one; and comparing the number of in-flight entries with the number of non-overlapping groups of N consecutive empty storage locations to determine if the queue is full.

2. The method as recited in claim 1, wherein said counting comprises:

creating a propagate bit for each storage location in the queue;

creating a generate bit for each storage location in the queue;

calculating a carry-out bit for each storage location in the queue;

logically ORing the carry-out bits to generate a plurality of empty string signals, wherein each empty string signal is indicative of whether an empty string of N storage locations begins at the corresponding storage location;

producing a plurality of decoded count signals from the plurality of empty string signals, wherein each decoded count signals is indicative of whether more than a particular number of empty strings of N storage locations are present.

3. The method as recited in claim 2, wherein said comparing comprises determining if the queue is full by comparing the number of desired empty strings with the decoded count signals.

4. The method as recited in claim 1, wherein each propagate bit corresponds to a particular storage location, wherein each propagate bit is asserted if a string of N empty storage locations begins with the corresponding storage location.

5. The method as recited in claim 1, wherein each generate bit corresponds to a particular storage location, wherein each generate bit is asserted if a string of N empty storage locations begins with the corresponding storage location and the storage location immediately following the N empty storage locations is not empty.

6. The method as recited in claim 5, wherein each carry-out bit is asserted if the corresponding generate bit is asserted or if the corresponding propagate bit is asserted and the next carry-out bit is asserted.

7. The method as recited in claim 5, wherein said calculating comprises conveying the generate and propagate signals to a carry-lookahead circuit.

8. The method as recited in claim 5, wherein said producing comprises:

dividing the plurality of empty string signals into a plurality of groups; and combining the plurality of groups using a plurality of stages of combinatorial logic.

9. A computer program embodied on a computer-readable medium, wherein the computer program is configured to implement the method of claim 1.

10. The microprocessor as recited in claim 9, wherein control logic is configured to reserve a variable number of storage locations equal to the number of in-flight instructions.

11. The microprocessor as recited in claim 9, wherein the control logic is configured to reserve a variable number of storage locations at least as large as the number of in-flight instructions.

12. The microprocessor as recited in claim 9, wherein said control logic is configured to receive information from one or more previous stages in said microprocessor, wherein said control logic is configured to utilize said information to approximate the number of in-flight instructions.

13. The microprocessor as recited in claim 9, wherein said control logic comprises a plurality of logic gates configured to detect a full state in said instruction queue by comparing the number of empty storage location strings remaining in the instruction queue with the number of empty storage strings desired, wherein a string is N empty instruction storage locations within said instruction queue.

14. The microprocessor as recited in claim 9, wherein said instruction queue is configured to receive up to N instructions per clock cycle from said instruction cache.

15. The microprocessor as recited in claim 9, wherein said control logic comprises:

a propagate/generate logic unit configured to calculate propagate and generate bits corresponding to the instruction storage locations in the instruction queue; and a carry-out logic unit coupled to receive said propagate bits and generate bits from said propagate/generate logic units, wherein said carry-out logic unit is configured to calculate carry-out bits corresponding to the instruction storage locations in the instruction queue, wherein the carry-out bits are calculated from the propagate bits and generate bits.

16. The microprocessor as recited in claim 15, wherein said control logic further comprises a plurality of OR-gates coupled to said carry-out logic unit and configured to logically OR groups of the carry-out bits together to form string empty bits, wherein each string empty bit is indicative of the presence of a particular string of N empty instruction storage locations in the instruction queue.

17. The microprocessor as recited in claim 16, wherein said control logic further comprises a plurality of adders configured to sum the string empty bits to generate a total number of empty strings.

18. The microprocessor as recited in claim 16, wherein said control logic further comprises a logic unit configured to generate a plurality of signals, wherein each signal corresponds to at least a certain number of empty strings within the instruction queue.

19. A microprocessor comprising:
   an instruction cache configured to store a plurality of instructions; and
   a floating point unit configured to receive and execute floating point instructions from said instruction cache, wherein said floating point unit comprises:
      an instruction queue configured to receive and store a plurality of floating point instructions;
      control logic coupled to said instruction queue, wherein said control logic is configured to:
         count the number of non-overlapping groups of N consecutive empty storage locations in the queue, wherein said number of groups includes groups which are separated by non-empty storage locations, and wherein N is a positive integer greater than one; and
         compare the number of number of in-flight entries with the number of non-overlapping groups of N consecutive empty storage locations to determine if the queue is full.

20. A computer system comprising:
   a microprocessor coupled to a CPU bus;
   a bus bridge coupled to said CPU bus; and
   a communications device coupled to said bus bridge via a peripheral bus, wherein said microprocessor comprises:
      an instruction cache configured to store a plurality of instructions;
      a floating point unit configured to receive and execute floating point instructions from said instruction cache, wherein said floating point unit comprises:
         an instruction queue configured to receive and store a plurality of floating point instructions;
         control logic coupled to said instruction queue, wherein said control logic is configured to:
            count the number of non-overlapping groups of N consecutive empty storage locations in the queue, wherein said number of groups includes groups which are separated by non-empty storage locations, and wherein N is a positive integer greater than one; and
            compare the number of number of in-flight entries with the number of non-overlapping groups of N consecutive empty storage locations to determine if the queue is full; and
         a plurality of functional units coupled to said instruction queue, wherein said functional units are configured to receive and execute floating point instructions from said instruction queue.

21. The computer system as recited in claim 20, wherein the variable number of in-flight instructions is an estimate.

22. A method for determining a number of empty storage locations in a queue, the method comprising:
   creating a propagate bit for each storage location in the queue;
   creating a generate bit for each storage location in the queue;
   calculating a carry-out bit for each storage location in the queue;
   logically ORing the carry-out bits to generate a plurality of empty string signals, wherein each empty string signal is indicative of whether an empty string of N storage locations begins at the corresponding storage location;
   producing a plurality of decoded count signals from the plurality of empty string signals, wherein each decoded count signals is indicative of whether more than a particular number of empty strings of N storage locations are present.

23. A microprocessor comprising:
   an instruction cache configured to store a plurality of instructions; and
   a floating point unit configured to receive and execute floating point instructions from said instruction cache, wherein said floating point unit comprises:
      an instruction queue configured to receive and store a plurality of floating point instructions; and
      control logic coupled to said instruction queue, wherein said control logic is configured to:
         create a propagate bit for each storage location in the instruction queue;
         create a generate bit for each storage location in the instruction queue;
         calculate a carry-out bit for each storage location in the instruction queue;
         logically OR the carry-out bits to generate a plurality of empty string signals, wherein each empty string signal is indicative of whether an empty string of N storage locations begins at the corresponding storage location; and
         produce a plurality of decoded count signals from the plurality of empty string signals, wherein each decoded count signals is indicative of whether more than a particular number of empty strings of N storage locations are present.

24. A computer system comprising:
   a microprocessor coupled to a CPU bus;
   a bus bridge coupled to said CPU bus; and
   a communications device coupled to said bus bridge via a peripheral bus, wherein said microprocessor comprises:
      an instruction cache configured to store a plurality of instructions;
      a floating point unit configured to receive and execute floating point instructions from said instruction cache, wherein said floating point unit comprises:
         an instruction queue configured to receive and store a plurality of floating point instructions;

control logic coupled to said instruction queue, wherein said control logic is configured to:
- create a propagate bit for each storage location in the instruction queue;
- create a generate bit for each storage location in the instruction queue;
- calculate a carry-out bit for each storage location in the instruction queue;
- logically OR the carry-out bits to generate a plurality of empty string signals, wherein each empty string signal is indicative of whether an empty string of N storage locations begins at the corresponding storage location; and
- produce a plurality of decoded count signals from the plurality of empty string signals, wherein each decoded count signals is indicative of whether more than a particular number of empty strings of N storage locations are present; and a plurality of functional units coupled to said instruction queue, wherein said functional units are configured to receive and execute floating point instructions from said instruction queue.

\* \* \* \* \*